(12) United States Patent
Wang et al.

(10) Patent No.: US 9,960,599 B1
(45) Date of Patent: May 1, 2018

(54) THYRISTOR CONTROLLED LC COMPENSATOR FOR COMPENSATING DYNAMIC REACTIVE POWER

(71) Applicant: University of Macau, Macau (MO)

(72) Inventors: Lei Wang, Macau (MO); Man-Chung Wong, Macau (MO); Chi-Seng Lam, Macau (MO)

(73) Assignee: University of Macau, Macau (MO)

( * ) Notice: Subject to any disclaimer, the term of this patent is extended or adjusted under 35 U.S.C. 154(b) by 0 days. days.

(21) Appl. No.: 15/614,672

(22) Filed: Jun. 6, 2017

(51) Int. Cl.
| | |
|---|---|
| *H02J 3/18* | (2006.01) |
| *H02J 3/01* | (2006.01) |
| *H02J 3/36* | (2006.01) |
| *H02J 3/26* | (2006.01) |
| *H02J 3/00* | (2006.01) |
| *H02M 1/12* | (2006.01) |
| *H02M 5/44* | (2006.01) |

(52) U.S. Cl.
CPC ............. *H02J 3/1821* (2013.01); *H02J 3/01* (2013.01); *H02J 3/26* (2013.01); *H02J 3/36* (2013.01); *H02J 2003/007* (2013.01); *H02M 1/12* (2013.01); *H02M 5/44* (2013.01)

(58) Field of Classification Search
CPC ...... H02J 3/01; H02J 3/1821; H02J 2003/007; H02J 3/36; H02J 3/26; H02M 5/44; H02M 1/00; H02M 1/126; H02M 1/15; H02M 7/7575
See application file for complete search history.

(56) References Cited

U.S. PATENT DOCUMENTS

| | | | | |
|---|---|---|---|---|
| 7,969,755 | B2 * | 6/2011 | Davies ................. | H02J 3/1864 |
| | | | | 363/35 |
| 9,099,936 | B2 * | 8/2015 | Gupta ..................... | H02M 5/44 |
| 2014/0146582 | A1 * | 5/2014 | Gupta ................. | H02M 7/7575 |
| | | | | 363/35 |

OTHER PUBLICATIONS

Lei Wang et al., "Design of A Thyristor Controlled LC Compensator for Dynamic Reactive Power Compensation in Smart Grid" IEEE Transactions on Smart Grid (vol. 8, Issue: 1, pp. 409-417, Jan. 2017).

* cited by examiner

*Primary Examiner* — Emily P Pham
(74) *Attorney, Agent, or Firm* — Spruson & Ferguson (HK)

(57) ABSTRACT

A thyristor controlled LC (TCLC) compensator for compensating dynamic reactive power in a power grid system, with an advantage of mitigating harmonic current injection from solid-state switches during switching on or off is provided. Exemplarily, the TCLC compensator is shunt-connected to the three-phase power grid and comprises an electronic controller, a coupling inductor ($L_c$), a first branch of circuit with a parallel inductor ($L_{PF}$) and a solid-state switch, and a second branch of circuit with a parallel capacitor ($C_{PF}$), wherein the coupling inductor ($L_c$) is connected in series with a parallel combination of the first and second branch of circuit. The electronic controller for the TCLC compensator is configured in accordance to the generalized instantaneous reactive power theory for improving the response speed instead of using traditional average reactive power concept.

18 Claims, 16 Drawing Sheets

THYRISTOR CONTROLLED LC COMPENSATOR FOR COMPENSATING DYNAMIC REACTIVE POWER

FIELD OF THE INVENTION

The present invention generally relates to compensating dynamic reactive power in a power grid system by a thyristor controlled LC (TCLC) compensator. In particular, the present invention relates to a design method, a control method and a system for dynamic reactive power compensation with an advantage of mitigating harmonic current injection from solid-state switches during switching on or off.

PRIOR DISCLOSURES BY THE INVENTOR OR A JOINT INVENTOR

Part of the present invention was disclosed in a paper published in the *IEEE Transactions on Smart Grid* (Volume: 8, Issue: 1, pp. 409-417, January 2017) on 7 Jun. 2016. This paper is a grace period inventor-originated disclosure disclosed within one year before the effective filing date of this application.

BACKGROUND OF THE INVENTION

The use of a smart grid connected renewable energy system has been regarded as our next-generation power grid for solving the energy crisis. The smart grid system transfers electrical power from a renewable energy source, like wind energy, and generates regulated power for industrial and domestic uses. However, the development of a smart grid presents many new challenges with respect to power quality [1]. In particular, reactive power has been a major issue. Large reactive power draws more reactive current which results in either an increase in the operating cost or a decrease in the transmission capacity. This necessitates various measures including the use of dynamic reactive power compensators to overcome the power quality issue.

Conventionally, a thyristor based static var compensator (SVC), comprising a fixed shunt capacitor in parallel with a thyristor-controlled reactor (FC-TCR), is used to control the firing angles of the thyristors and compensate for the reactive power [2]. However, during the operation of the FC-TCRs, low-order harmonic currents are generated, which can deteriorate system performance. This problem was particularly discussed by Haque et al. with no solution provided [3].

In order to address the problem of harmonic current injection static synchronous compensator (STATCOM) was developed to achieve better power stability. STATCOM is a voltage-source converter using an insulated-gate bipolar transistor (IGBT) or an integrated gate commutated thyristor (IGCT). This system has faster response and less harmonic current injection than SVC [4]. However, a STATCOM system is more expensive than SVC at the same VA power rating. Therefore, this topology failed to replace the older SVC technology.

Benton [5] and Zanotto et al. [6] suggested the use of a parallel combination of SVC and passive power filter (SVC+PPF) to reduce the harmonic current injection. However, the oscillating time and cost of this approach are both significantly higher. Subsequently, Luo et al. [7] proposed a combined system of the SVC and the STATCOM, which can eliminate harmonic current injection by the SVC and compensate for both the reactive power and harmonic current of the nonlinear load. However, considering the complexity of the system, the initial cost of this approach can be very high. In order to reduce the initial cost, Kulkami et al. [8] proposed an artificial neural network (ANN) approach to identify the optimum trigger angles for the thyristor controlled reactors and thyristor switched capacitors (TCR-TSC) with lowered harmonic current injection. However, as the firing angles are probably not matched with the required compensating reactive power, the TCR-TSC may sacrifice its reactive power compensation capability.

As a result, there is a need for a technique for compensating for dynamic reactive power in a power grid system by a thyristor controlled LC (TCLC) compensator that also mitigates harmonic current injection problem by the thyristor (during switching on or off) at a low cost.

SUMMARY OF THE INVENTION

Accordingly, a thyristor controlled LC (TCLC) compensator for compensating dynamic reactive power in a power grid system is provided. The TCLC compensator comprises three branches of sub-circuit, each branch of sub-circuit having a first branch-terminal and a second branch-terminal and an electronic controller for controlling the solid-state bidirectional switch of each branch of sub-circuit and determining when to switch on the solid-state bidirectional switch. Each branch of sub-circuit further comprises a controllable reactor (CR) comprising a parallel inductor ($L_{PF}$) connected in series with a solid-state bidirectional switch; a coupling inductor ($L_c$) having a first terminal and a second terminal, the first terminal being connected to a line in the power grid system and the second terminal being connected to the CR; and a parallel capacitor ($C_{PF}$) connected in parallel to the CR. The coupling inductor ($L_c$) is determined according to a harmonic order (n) of the harmonic current generated to the line in the power grid system by the solid-state bidirectional switch in the TCLC compensator such that the harmonic current is mitigated, where n is selected such that the selected n is smaller than 5, so that the harmonic current generated under the selected resonance order n is less than 50% of the harmonic current generated under n=5; and the selected n is greater than 1.5 (n>1.5) so that an inductance of the coupling inductor ($L_c$) under the selected n is less than 50% of an inductance of the coupling inductor ($L_c$) under n=1.5 ($X_{L_c}(n) \leq 0.5 \cdot X_{L_c}(n=1.5)$).

Preferably, the TCLC compensator is connected in a star configuration or a delta configuration. Wherein the star configuration has the first branch-terminal of each branch of sub-circuit connected to each line of the power grid system, and has all the second branch-terminals of all sub-circuits interconnected. Alternatively, the delta configuration has the first branch-terminal of each branch of sub-circuit connected to both line of the power grid system and the second branch-terminal of another branch of sub-circuit, and has the second branch-terminal connected to both another line of the power grid system and the first terminal of the third remaining branch of sub-circuit.

Preferably, the TCLC compensator is shunt-connected to each line of the power grid system at the terminal of the system inductor ($L_s$) with a grid voltage ($V_x$) on each power line.

Preferably, the solid-state bidirectional switch comprises two back-to-back connected thyristors ($T_{x1}$ and $T_{x2}$).

Preferably, the parallel capacitor ($C_{PF}$) has fundamental impedance larger than the parallel inductor's ($L_{PF}$) fundamental impedance.

Preferably, the parallel capacitor ($C_{PF}$) of the TCLC compensator has a capacitance value selected to maximize a reactive power compensation range by the equations (4a), (5a) and (6a) for a star configuration, and by the equations (4b), (5b) and (6b) for a delta configuration.

Preferably, the parallel inductor ($L_{PF}$) has an inductance value selected to maximize a reactive power compensation range by the following equations (4a), (5a) and (7a) for a star configuration, and by the equations (4b), (5b) and (7b) for a delta configuration.

Preferably, the coupling inductor ($L_c$) has an inductance value selected according to the equations (21) to minimize the harmonic currents injection.

Preferably, the firing angle ($\alpha$) of the solid-state bidirectional switch is selected according to the following equations (1), (22a), (23) and (24) in star configuration, and according to the following equations (1), (22b), (23) and (24) in delta configuration.

Preferably, the electronic controller further comprises a phase lock loop (PLL), a plurality of low pass filters ($L_{PF}$), a look-up table (LUT) and a comparator.

Preferably, the firing angle ($\alpha$) is deduced and obtained from a look-up table (LUT) in the electronic controller. The firing angle ($\alpha$) generates a trigger signal by comparing the firing angle ($\alpha$) with the phase angle of each instantaneous grid voltage ($v_x$).

DETAILED DESCRIPTION

Figure 1:
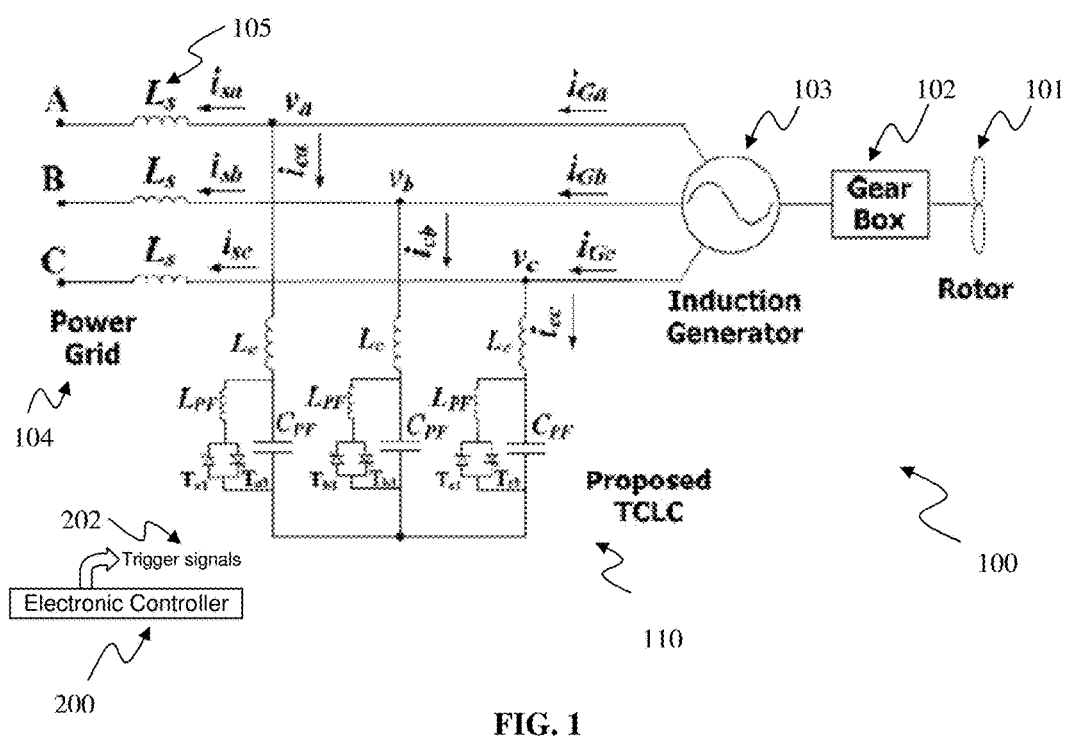
FIG. 1 is a schematic diagram illustrating an exemplarily three-phase three-wire power grid system connected in star configuration with a TCLC compensator.

The following definitions are used herein in the specification and the appended claims. "TCLC compensation system" is used to represent a three-phase three-wire power grid system with a TCLC compensator, disclosed herein, connected thereto for compensating for reactive power. "Power grid system" is an interconnected network for delivering electricity from an electricity-generation source to consumers, wherein the electricity-generation source is referred as a "power source". An example of the power source is a renewable energy source. The preferred application of the present disclosure is wind farm. In certain embodiments, the power grid system is a three-phase system in electricity transmission. Practically, it is common that three phases are used in the power grid system. "System frequency" is the line frequency or nominal frequency of the oscillations of alternating current (AC) in a power grid system, which is typically at 50 Hz or 60 Hz. "Line" in a power grid means any one of the three phases in the power grid. The power transported and supplied by the power grid system consists of "real power" and "reactive power". The real power accomplishes the net transfer of energy from the electricity-generation source to a load via the power grid system. The reactive power, due to the phase difference between the voltage and the current, transfers no net energy to the load. "Apparent power" is the vector sum of the real power and reactive power, which can be used to calculate the power factor (PF). Throughout the specification, drawings and appended claims, the subscript "x" is used to denote phase a, b and c generally and collectively. "Grid voltage", "phase grid voltage" and "root mean square grid voltage" are used interchangeably with the abbreviation $V_x$ (with a capital letter "V") to refer to the root mean square phase grid voltage generally at each line of the power grid. "Instantaneous grid voltage" with the abbreviation $v_x$ is the grid voltage at a particular moment. "Harmonics" in a power grid is a sinusoidal component of the periodic wave in the power grid (both voltage and current) having a harmonic frequency that is a multiple order of the system frequency of the power grid. As the TCLC compensator would generate harmonic currents during each switching cycle of the thyristors, the multiple order of the system frequency of the power grid in the generated harmonic current is referred as "harmonic order". A large harmonic current can generate undesirable distortion to the periodic wave in the power grid. Therefore, it is necessary for the power grid to meet a standard of quality with less distortion. Unless otherwise specified, "the standard" refers to the "IEEE standard 519-2014" [10], which sets out the recommended limits for the system current and system voltage total harmonic distortions (TH-$Di_{sx}$ and $THDv_{sx}$) for inductive and capacitive reactive power compensations.

A "thyristor", "silicon controlled rectifier" and "SCR", as used herein, are used interchangeably to refer to a solid-state semiconductor device with three terminals and four layers of alternating N-type and P-type materials, wherein the three terminals are labeled as anode, cathode and gate. In order to simplify the schematic diagrams shown in FIGS. 1, 2 and 3, the signal connections to the electronic controller and the connections between the electronic controller and the gate terminals of the thyristors are not shown so that the schematic diagrams are clear and easy to read. The signal connections to the electronic controller and the connections between the electronic controller and the gate terminals of the thyristors are detailed and shown in FIG. 5 instead.

Provided herein is a thyristor controlled LC (TCLC) compensator for compensating dynamic reactive power in a power grid system, which mitigates harmonic current injection from solid-state switches during switching on or off. An exemplarily TCLC compensator is shunt-connected to the three-phase power grid system and comprises an electronic controller, a coupling inductor ($L_c$), a first branch of circuit with a parallel inductor ($L_{PF}$) and a solid-state switch, and a second branch of circuit with a parallel capacitor ($C_{PF}$), wherein the coupling inductor ($L_c$) is connected in series with a parallel combination of the first and second branch of circuit. The electronic controller for the TCLC compensator is configured in accordance to the generalized instantaneous reactive power theory for improving the response speed instead of using traditional average reactive power concept.

Circuit Configuration

Figure 2:
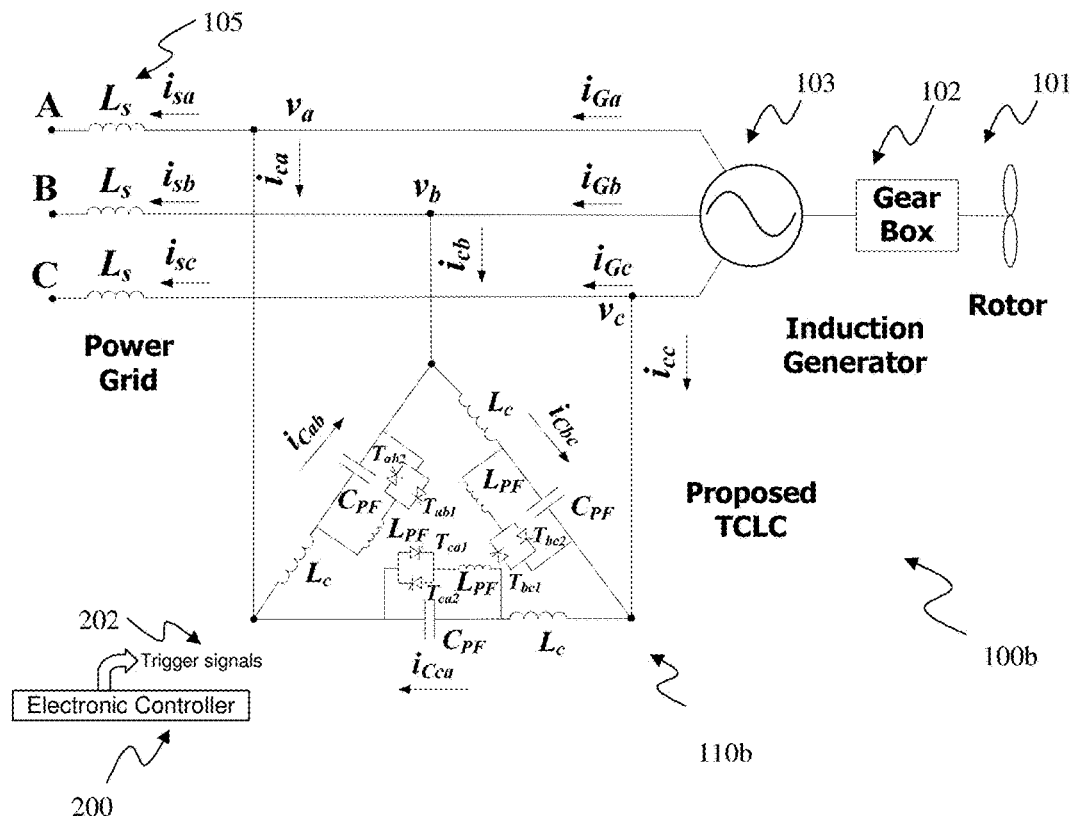
FIG. 2 is a schematic diagram illustrating an exemplarily three-phase three-wire power grid system connected in delta configuration with a TCLC compensator.

An exemplary TCLC compensator is illustrated in FIG. 1, which depicts a schematic diagram of a three-phase three-wire TCLC compensation system 100 connected in a star configuration. The topology is based on the SVC structure with improvements to compensate for the dynamic reactive power and mitigate harmonic current injection of the solid-state bidirectional switch 112. The TCLC compensation system 100 compensates the reactive power generated from a renewable energy source for industrial and/or domestic uses. In the case of wind power, the energy is generated from a rotor 101 and a gear box 102 of a wind turbine. Although the embodiments disclosed are predominantly based on wind power as an example of the renewable energy source, it should be understood that other power sources other than wind power are within the scope of the present disclosure.

The TCLC compensation system 100 comprises a three-phase power grid system 104, an induction generator 103, a thyristor controlled LC (TCLC) compensator 110 with three branches of sub-circuit and an electronic controller 200. The induction generator 103 is an alternating current (AC) electrical generator for generating three-phase power from the gear box 102 of the wind turbine. It can generate a phase grid voltage ($v_x$) with a generated grid current ($i_{Gx}$) on each line. In an alternative embodiment, the induction generator 103 can be replaced by other synchronous generators. On each phase of the power grid system 104, there is a system inductor ($L_s$) 105 for limiting the current and filtering out the current spikes. The system inductor ($L_s$) 105 can be a single inductor or a plurality of inductors connected in series. At the terminal of the system inductor ($L_s$) 105 measures a phase grid voltage ($v_x$). For each phase of power grid 104, a TCLC compensator 110 is shunt connected to the power grid system correspondingly at the terminal of the system inductor ($L_s$) 105 for reducing the harmonic current injection and improving the reactive power compensation. The generated grid current ($i_{Gx}$) from the induction generator 103 is divided accordingly such that a power grid current ($i_{sx}$) flows through the system inductor ($L_s$) 105 and a compensating current ($i_{cx}$) flows to the TCLC compensator 110.

The TCLC compensator 110 comprises three branches of sub-circuit, where each branch of sub-circuit having a first branch-terminal and a second branch-terminal. The three branches of sub-circuit are similar in structure with the same components. Each branch of sub-circuit is connected to one line of the power grid system for compensating dynamic reactive power. Each branch of sub-circuit further comprises a coupling inductor ($L_c$) 106 connected in series with a combination of a parallel capacitor ($C_{PF}$) 109 in parallel with a controllable reactor (CR) 111 with a firing angle α of the solid-state bidirectional switch. The controllable reactor (CR) 111 further comprises a parallel inductor ($L_{PF}$) 107 connected in series with a solid-state bidirectional switch 112. The solid-state bidirectional switch 112 can be realized as two back-to-back connected thyristors ($T_{x1}$ and $T_{x2}$) 108. The two thyristors 108 are connected together in an inverse parallel manner with respect to each other while the gate terminals are connected to an electronic controller 200. Hence, the solid-state bidirectional switch 112 can be switched "on" by the trigger signals 202 from the control component 200. The embodiments in FIG. 1 are connected in star configuration, wherein the first branch-terminal of each branch of sub-circuit is connected to each line of the power grid system, and all the second branch-terminals of the sub-circuits are interconnected. In light of the simplicity of the circuit configurations, the TCLC compensator 110 is efficient and cost-effective. Alternatively, the TCLC compensation system 100 can be connected in delta configuration, by connecting a delta-configured TCLC compensator 110b to the power grid 104 as demonstrated in FIG. 2. In the delta-configured TCLC compensator 110b, the first branch-terminal of each branch of sub-circuit is connected to both line of the power grid system and the second branch-terminal of another branch of sub-circuit, while the second branch-terminal of the above-mentioned branch of sub-circuit is connected to both another line of the power grid system and the first terminal of the third remaining branch of sub-circuit. The analysis and discussion of the TCLC compensation system in delta configuration 100b holds the same as in star configuration (FIG. 1), and the delta configuration is within the scope of present disclosure.

By applying the basic theories related to the calculation of impedance in electronic circuits, the equivalent fundamental impedance of the TCLC compensator 110 ($X_{TCLC}(\alpha)$) for both star connected (phase impedance) and delta connected (line to line impedance) can be calculated and expressed as:

$$X_{TCLC}(\alpha) = \frac{X_{TCR}(\alpha) \cdot X_{C_{PF}}}{X_{C_{PF}} - X_{TCT}(\alpha)} + X_{L_c} = \frac{\pi X_{L_{PF}} X_{C_{PF}}}{X_{C_{PF}}(2\pi - 2\alpha + \sin 2\alpha) - \pi X_{L_{PF}}} + X_{L_c} \quad (1)$$

where $X_{L_c}$ is the fundamental impedances of the coupling inductor $L_c$ 106, $X_{L_{PF}}$ is the fundamental impedances of the parallel inductor $L_{PF}$ 107, and $X_{C_{PF}}$ is the fundamental impedances of the parallel capacitor $C_{PF}$ 109.

Accordingly, the equivalent fundamental impendence of the controllable reactor (CR) 111 can be expressed as follows:

$$X_{TCR}(\alpha) = \frac{\pi}{2\pi - 2\alpha + \sin 2\alpha} \cdot X_{L_{PF}} \quad (2)$$

Dynamic Reactive Power Compensation

In an alternating current (AC) network, the reactive power is the result of the capacitive and inductive elements in the network. The reactive power can influence and misalign the voltage and current waveforms. As the apparent power is the vector sum of the real power and reactive power, the power factor (PF) will inevitably be lowered if the reactive power is too high. In order to compensate the dynamic reactive power in the power grid 104, it is preferable to have the TCLC compensator 110 configured so that the compensating reactive power ($Q_{cx}$) is equal to the generated reactive power from the power source ($Q_{Gx}$) to compensate the dynamic reactive power. As the compensating reactive power ($Q_{cx}$) is related to the fundamental impedance of the TCLC compensator 110 ($X_{TCLC}(\alpha)$), by simple Ohm's law we can have the following equation:

(for TCLC compensator in star configuration)

$$Q_{cx} = \frac{V_x^2}{X_{TCLC}(\alpha)} = \frac{V_x^2}{\frac{\pi X_{L_{PF}} X_{C_{PF}}}{X_{C_{PF}}(2\pi - 2\alpha + \sin 2\alpha) - \pi X_{L_{PF}}} + X_{L_c}} \quad (3a)$$

(for TCLC compensator in delta configuration)

$$Q_{cxy} = \frac{V_{xy}^2}{X_{TCLC}(\alpha)} = \frac{3 \cdot V_x^2}{\frac{\pi X_{L_{PF}} X_{C_{PF}}}{X_{C_{PF}}(2\pi - 2\alpha + \sin 2\alpha) - \pi X_{L_{PF}}} + X_{L_c}} \quad (3b)$$

where $V_x$ is the root mean square phase grid voltage on each power line, $Q_{cx}$ and $Q_{cxy}$ are phase and line to line compensating reactive power, x and y stands for phase a, b and c.

The compensating reactive power $Q_{cx}$ and $Q_{cxy}$ depends on $X_{L_c}$, $X_{L_{PF}}$, $X_{C_{PF}}$ and $\alpha$, all of which can be used to design and configure the parameters for the coupling inductor $L_c$ 106, the parallel inductor $L_{PF}$ 107, the parallel capacitor $C_{PF}$ 109 and the firing angle ($\alpha$) in the solid-state bidirectional switch 112. The two back-to-back connected thyristors $T_{x1}$ and $T_{x2}$ 108 are triggered alternately in every half cycle.

Figure 4:
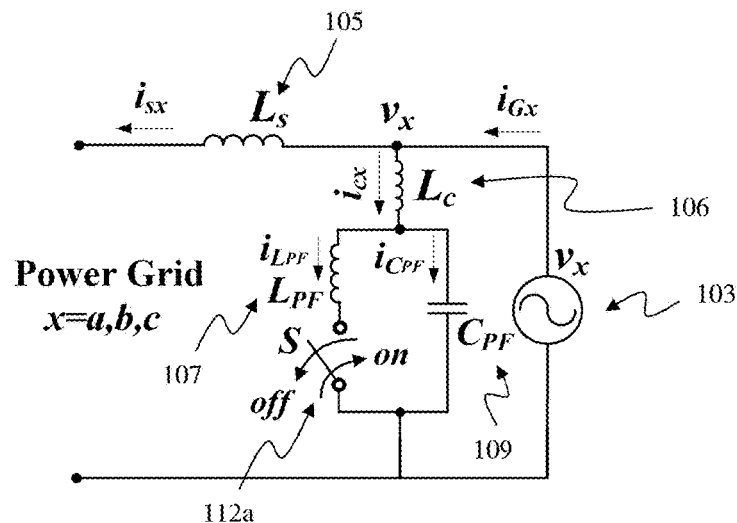
FIG. 4 is a schematic diagram illustrating an exemplarily equivalent single phase TCLC compensator with the corresponding power line.

FIG. 4 is a schematic drawing of an equivalent single phase TCLC compensator 110. The solid-state bidirectional switch 112 is switched "on" according to the trigger signals 202 from the electronic controller 200, and is represented by a switch S 112a for simplicity and clear illustration of the operation. When the firing angle $\alpha$ is set to 1800, both thyristors $T_{x1}$ and $T_{x2}$ 108 for each phase are turned off for the whole fundamental period, which is equivalent to setting the switch S 112a to an "off" state. The current across the parallel inductor $L_{PF}$ 107 ($i_{L_{PF}}$) is zero and the TCLC compensator 110 is comparable to a coupling inductor $L_c$ 106 connected in series with a parallel capacitor $C_{PF}$ 109, and operates as a LC filter. The maximum capacitive compensating reactive power $Q_{cx(MaxCap)}$ from the TCLC compensator 110 can be expressed as:

(for TCLC compensator in star configuration)

$$Q_{cx(MaxCap)} = -\frac{V_x^2}{X_{C_{PF}} - X_{L_c}} \quad (4a)$$

(for TCLC compensator in delta configuration)

$$Q_{cxy(MaxCap)} = -\frac{V_{xy}^2}{X_{C_{PF}} - X_{L_c}} = -\frac{3 \cdot V_x^2}{X_{C_{PF}} - X_{L_c}} \quad (4b)$$

Alternatively, when the firing angle $\alpha$ is set to 900, one of the thyristors 108 in the solid-state bidirectional switch 112 is turned on for half of the fundamental period, which is equivalent to setting the switch S 112a to an "on" state. The TCLC compensator 110 is comparable to a coupling inductor $L_c$ 106 connected in series with a parallel combination of a parallel inductor $L_{PF}$ 107 and a parallel capacitor $C_{PF}$ 109. The maximum inductive reactive power $Q_{cx(MaxInd)}$ from the TCLC compensator 110 can be expressed as:

(for TCLC compensator in star configuration)

$$Q_{Cx(MaxInd)} = \frac{V_x^2}{\frac{X_{L_{PF}} X_{C_{PF}}}{X_{C_{PF}} - X_{L_{PF}}} + X_{L_c}} \quad (5a)$$

(for TCLC compensator in delta configuration)

$$Q_{cy(MaxInd)} = \frac{V_{xy}^2}{\frac{X_{L_{PF}} X_{C_{PF}}}{X_{C_{PF}} - X_{L_{PF}}} + X_{L_c}} = \frac{3 \cdot V_{xy}^2}{\frac{X_{L_{PF}} X_{C_{PF}}}{X_{C_{PF}} - X_{L_{PF}}} + X_{L_c}} \quad (5b)$$

FIG. 18 shows the relationships between $Q_{cx}$, $\alpha$, $L_c$, $L_{PF}$ and $C_{PF}$ when only one of the TCLC parameters ($L_c$, $L_{PF}$ or $C_{PF}$) is varying. The calculation is based on the conditions in Table I.

TABLE I

System parameters of power grid and the
disclosed TCLC compensators for calculation

| Parameters | Value |
|---|---|
| $v_x$, f | 110 V, 50 Hz |
| $L_c$ | 5 mH |
| $L_{PF}$ | 30 mH |
| $C_{PF}$ | 160 µF |

Figure 18A:
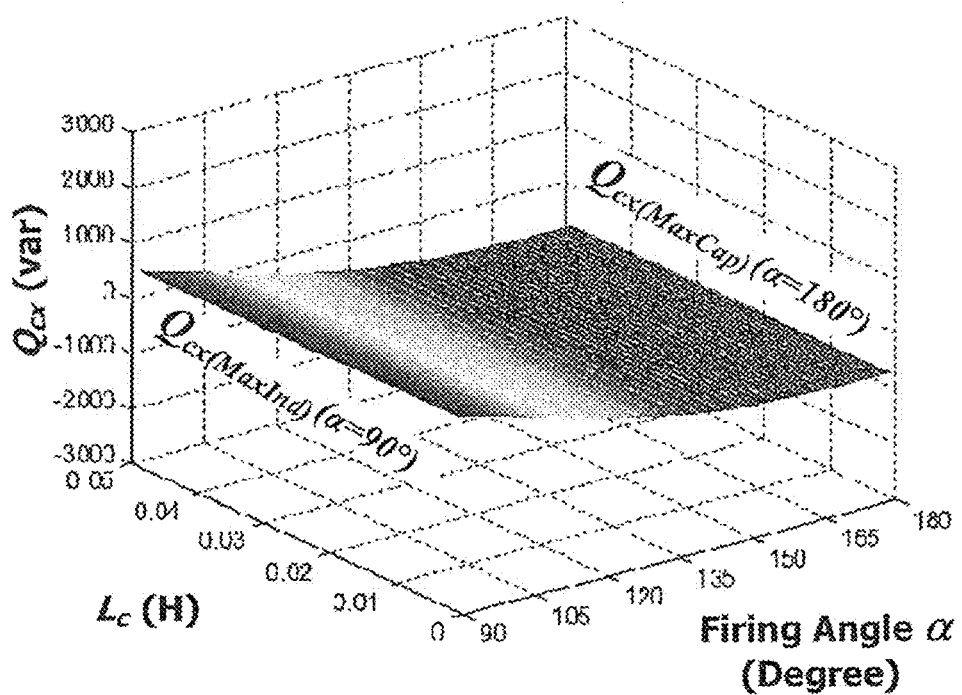
FIG. 18A shows the relationships between $Q_{cx}$, $\alpha$, $L_c$, $L_{PF}$ and $C_{PF}$ when only $L_C$ is varying.
Figure 18B:
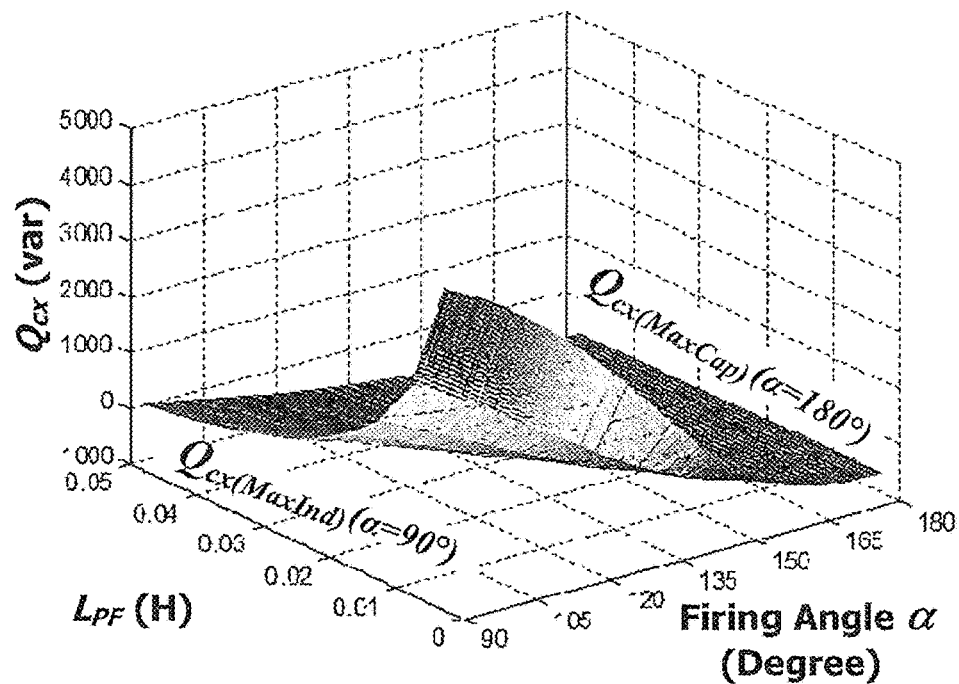
FIG. 18B shows the relationships between $Q_{cx}$, $\alpha$, $L_c$, $L_{PF}$ and $C_{PF}$ when only $L_{PF}$ is varying.
Figure 18C:
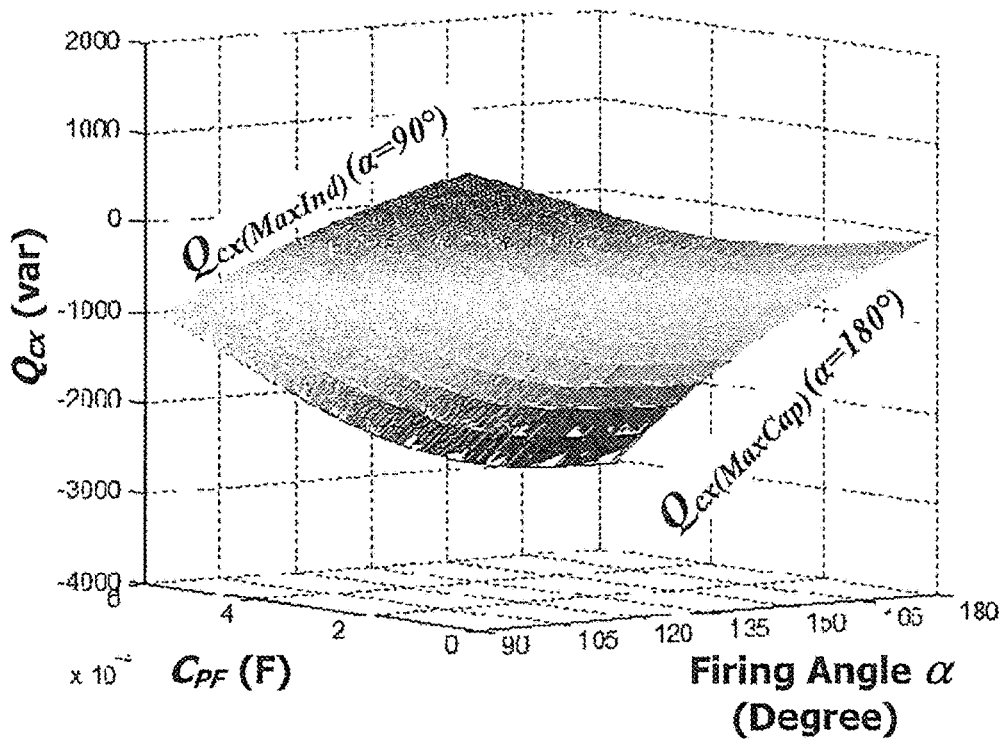
FIG. 18C shows the relationships between $Q_{cx}$, $\alpha$, $L_c$, $L_{PF}$ and $C_{PF}$ when only $C_{PF}$ is varying.

From FIG. 18A, there is no significant change on the $Q_{cx}$ when $L_c$ is varied from 0 to 5 mH for all values of α. Therefore, $Q_{cx}$ is not sensitive to the variation of $L_c$. From FIG. 18B, the inductive reactive power $Q_{cx(MaxInd)}$ at α=90° highly depends on the value of $L_{PF}$, while the capacitive compensating reactive power $Q_{cx(MaxCap)}$ at α=180° is relatively independent of $L_{PF}$. From FIG. 18C, the capacitive compensating reactive power $Q_{cx(MaxCap)}$ highly depends on $C_{PF}$ when α changes. In addition, it is noted that the inductive reactive power $Q_{cx(MaxInd)}$ may disappear when $C_{PF}$ is increasing. This can be explained by the above equation (5) as well, as it is noted that the inductive reactive power $Q_{cx(MaxInd)}$ may be negative when $X_{C_{PF}} < X_{L_{PF}}$. Therefore, it is necessary to design $X_{C_{PF}} > X_{L_{PF}}$ by using a smaller $C_{PF}$ so that the TCLC comparator 110 can compensate the inductive reactive power.

As the reactive power compensating range of the TCLC compensator 110 depends mainly on the values of the parallel capacitor $C_{PF}$ 109 and the parallel inductor $L_{PF}$ 107, and less significant on the coupling inductor $L_c$ 106. As explained above, it is preferable to have $Q_{cx}=Q_{Gx}$ so that the TCLC compensator 110 can compensate the dynamic reactive power. The maximum inductive reactive power $Q_{Gx(MaxInd)}$ is therefore equal to $Q_{cx(MaxCap)}$ for maximizing the inductive reactive power generated; and the maximum capacitive reactive power $Q_{Gx(MaxCap)}$ is equal to $Q_{cx(MaxInd)}$ as generated by the power source for maximizing the capacitive reactive power generated. The capacitance of the parallel capacitor $C_{PF}$ 109 and the inductance of the parallel inductor $L_{PF}$ 107 can be calculated accordingly:
(for TCLC compensator in star configuration)

$$C_{PF} = \frac{Q_{Gx(MaxInd)}}{\omega^2 Q_{Gx(MaxInd)} L_c - \omega V_x^2} \quad (6a)$$

(for TCLC compensator in delta configuration)

$$C_{PF} = \frac{Q_{Gxy(MaxInd)}}{\omega^2 Q_{Gxy(MaxInd)} L_c - 3 \cdot \omega V_x^2} \quad (6b)$$

and
(for TCLC compensator in star configuration)

$$L_{PF} = \frac{V_x^2 - \omega L_c Q_{Gx(MaxCap)}}{\omega Q_{Gx(MaxCap)} - \omega^3 L_c C_{PF} Q_{Gx(MaxCap)} + \omega^2 V_x^2 C_{PF}} \quad (7a)$$

(for TCLC compensator in star configuration)

$$L_{PF} = \frac{3V_x^2 - \omega L_c Q_{Gxy(MaxCap)}}{\omega Q_{Gxy(MaxCap)} - \omega^3 L_c C_{PF} Q_{Gxy(MaxCap)} + 3 \cdot \omega^2 V_x^2 C_{PF}} \quad (7b)$$

where ω is the fundamental angular frequency; x and y stand for sequential phase a, b, c Harmonic Current Rejection A particular aspect of the present disclosure is a method and system to minimize the harmonic current injection in the alternating current (AC) network. In the conventional design of SVC (FC-TCR), there is no coupling inductor $L_c$ 106 in the TCLC compensator 110 circuit to reject the current harmonics generated by the thyristors 108. As a result, low-order harmonic currents are generated during the switching of the solid-state bidirectional switch 112 in SVC, which would inevitably deteriorate the overall performance.

Figure 3:
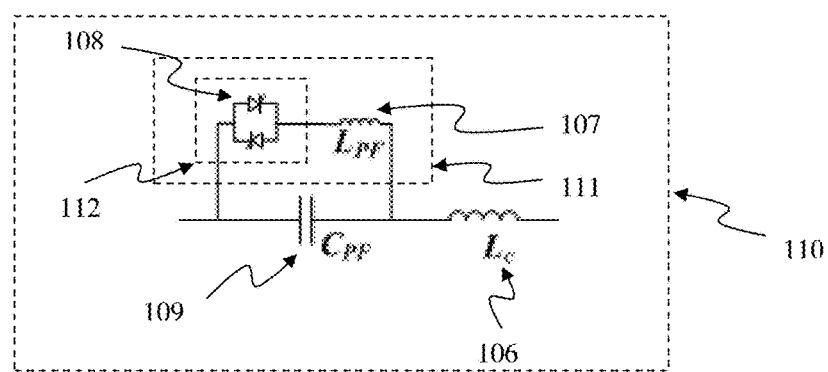
FIG. 3 is a schematic diagram illustrating an exemplarily single phase TCLC compensator.

Advantageously, the TCLC compensator introduces a circuit configuration with a coupling inductor $L_c$ 106 in the TCLC compensator 110 for harmonic current rejection. As illustrated in FIG. 3, the thyristors ($T_{x1}$ and $T_{x2}$) 108 for each phase of the disclosed TCLC compensator 110 can be considered as a pair of bidirectional switches, which can generate low order harmonic currents when the solid-state bidirectional switch 112 changes state between "on" and "off". In order to enhance the performance, it is necessary to perform harmonic current rejection analysis to determine the optimum configuration. The harmonic current orders as generated can be deduced in terms of $L_c$. Therefore, with appropriate design of the coupling inductor $L_c$ 106, the harmonic current injection by the solid-state bidirectional switch 112 can be minimized.

FIG. 4 depicts an equivalent single phase TCLC compensator 110 for performing harmonic current rejection analysis. The analysis and model in FIG. 4 are very similar for a star connected TCLC compensator and a delta connected TCLC compensator, and the star connected TCLC compensator is provided as below. The solid-state bidirectional switch 112 is represented by a switch S 112a for simplicity and clear illustration. When the switch S 112a is turned off, the differential equation of compensating current $i_{cx}(t)$ can be obtained as:

$$L_c \frac{di_{cx}(t)}{dt} + \frac{1}{C_{PF}} \int i_{cx}(t)dt = v_x(t) \quad (8)$$

On the other hand, when the switch S 112a is turned on, the following relationships can be obtained:

$$L_c \frac{di_{cx}(t)}{dt} + \frac{1}{C_{PF}} \int i_{C_{PF}}(t)dt = v_x(t) \quad (9)$$

$$L_{PF} \frac{di_{L_{PF}}(t)}{dt} = \frac{1}{C_{PF}} \int i_{C_{PF}}(t)dt \quad (10)$$

and $$i_{L_{PF}} + i_{C_{PF}} = i_{cx} \quad (11)$$

Combining (9)-(11), the equation in term of $i_{cx}(t)$ can be obtained as:

$$L_c L_{PF} C_{PF} \frac{d^3 i_{cx}(t)}{dt^3} - L_{PF} C_{PF} v_x(t) \frac{d^2 i_{cx}(t)}{dt^2} + (L_c + L_{PF}) \frac{di_{cx}(t)}{dt} = v_x(t) \quad (12)$$

When the switch S 112a is turned off, the current $i_{cx}$ across the coupling inductor $L_C$ 106, $i_{cx\_off}(t)$, is a second order equation. Meanwhile, when the switch S 112a is turned on, the current $i_{cx}$ across the coupling inductor $L_C$ 106, $i_{cx\_on}(t)$, is a third order equation. Both $i_{cx\_off}(t)$ and $i_{cx\_on}(t)$ can be deduced by solving their differential equations (or by a Laplace transform) in (8) and (12). The resulting $i_{cx\_off}(t)$ and $i_{cx\_on}(t)$ can be expressed as follow with a fundamental current and a harmonic current:

$$i_{cx\_off}(t) = \underbrace{A_1 \sin(\omega t - \alpha)}_{Fundamental} + \underbrace{K_1 \sin(\omega_1 t + \phi_1)}_{Harmonic} \quad (13)$$

and $$i_{cx\_on}(t) = \underbrace{A_2 \sin(\omega t + \alpha)}_{Fundamental} + \underbrace{K_2 \cos(\omega_2 t + \phi_2) + K_3}_{Harmonic} \quad (14)$$

where:
- $\alpha$ is the firing angle of the solid-state bidirectional switch;
- $A_1$ and $A_2$ are the peak values of the fundamental compensating current;
- $K_1$, $K_2$, $K_3$, $\phi_1$ and $\phi_2$ are constants during each switching cycle;
- f is the system frequency;
- $\omega$ is the system fundamental angular frequency with $\omega = 2\pi f$, and
- $\omega 1$ and $\omega 2$ are the harmonic angular frequencies.

Based on the above calculation, $\omega_1$ and $\omega_2$ can be obtained as the roots ($r_1$ and $r_2$) of the homogeneous equations of (8) and (12):

$$r_1^2 + \frac{1}{L_c C_{PF}} = 0 \quad (15)$$

and $$L_c L_{PF} C_{PF} r_2^3 + (L_c + L_{PF}) r_2 = 0 \quad (16)$$

Then, $\omega_1$ and $\omega_2$ can be obtained as the roots of $r_1$ and $r_2$:

$$\omega_1 = \frac{1}{\sqrt{L_c C_{PF}}} (r_1 = \pm j\omega_1) \quad (17)$$

and $$\omega_2 = \sqrt{\frac{L_c + L_{PF}}{L_c L_{PF} C_{PF}}} (r_2 = \pm j\omega_2) \quad (18)$$

Based on the equations (13), (14), (17) and (18), they clearly show that the solid-state bidirectional switch in the TCLC compensator 110 would generate harmonic currents during each switching cycle. The corresponding harmonic orders of the harmonic current generated to the line in the power grid system can be given as:

$$n_1 = \frac{\omega_1}{2\pi f} = \frac{1}{2\pi f \sqrt{L_c C_{PF}}} \quad (19)$$

and $$n_2 = \frac{\omega_2}{2\pi f} = \frac{1}{2\pi f} \sqrt{\frac{L_c + L_{PF}}{L_c L_{PF} C_{PF}}} \quad (20)$$

The harmonic orders $n_1$ and $n_2$, as illustrated in the equations (19) and (20), mainly depend on the parameters for the coupling inductor $L_c$ 106, the parallel inductor $L_{PF}$ 107 and the parallel capacitor $C_{PF}$ 109. For a three-phase three-wire system 100, there are no $3n^{th}$ order harmonic currents and the common harmonic orders are $6n \pm 1$ with $n = 1, 2, 3 \ldots$. Particularly, the $5^{th}$ order harmonic (6n−1) imposes the highest harmonic current to the system. To avoid the harmonic current injection generated by the solid-state bidirectional switch 112, it is necessary to tune $n_1$ and $n_2$ to be smaller than and away from the $5^{th}$ order. As the harmonic orders $n_1$ and $n_2$ depend on the parameters for the coupling inductor $L_c$ 106, the design criteria of $L_c$ 106 can be given as:

$$L_c = \frac{1}{(2\pi f n_1)^2 C_{PF}} \text{ and } L_c = \frac{1}{(2\pi f n_2)^2 C_{PF} - 1/L_{PF}} \quad (21)$$

Figure 6:
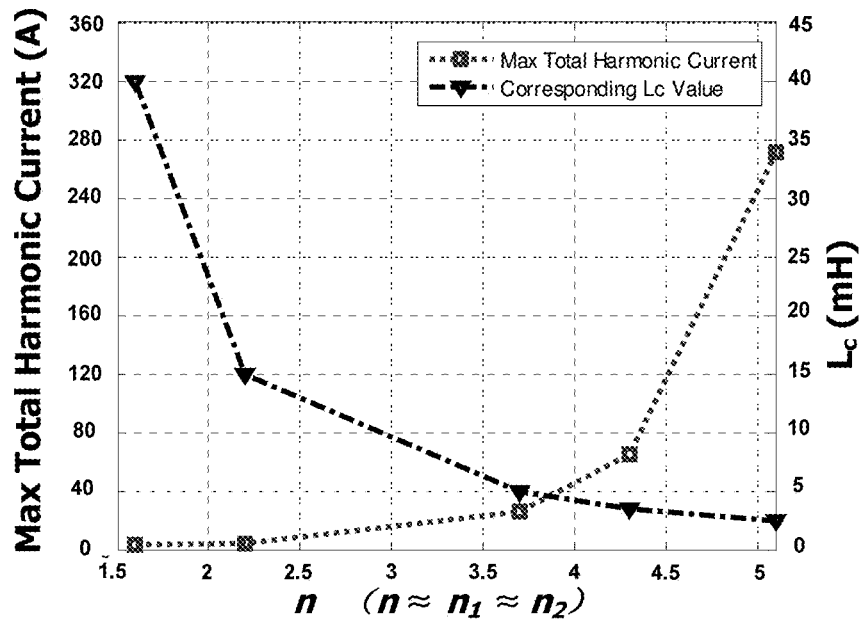
FIG. 6 shows the total harmonic current injection of the TCLC compensator and the corresponding $L_C$ value with varying $n \approx n_1 \approx n_2$.

The harmonic orders $n_1$ and $n_2$ are inversely proportional to the inductance of the coupling inductor $L_c$ 106. Therefore, with regards to the cost of the coupling inductor $L_c$ 106, it is not ideal to dramatically reduce the harmonic orders $n_1$ and $n_2$ solely for minimizing the total injected harmonic current. In fact, it is necessary to find a balance between the harmonic current consumption and the cost of the coupling inductor $L_c$ 106. FIG. 6 shows the total harmonic current injection by the TCLC compensator 110 and the corresponding value of the coupling inductor $L_c$ 106 for different harmonic orders.

In certain embodiments, the harmonic order n of the harmonic current is selected to be smaller than and away from 5 to limit the total injected harmonic current under the selected n not more than 50% of the total injected harmonic current under n=5. In another embodiment, the harmonic order n of the harmonic current is selected to be smaller than 5 to limit the total injected harmonic current under the selected n not more than 50% of the total injected harmonic current under n=5.

Similarly, in order to minimize the cost of the coupling inductor $L_c$ 106, the harmonic order should not be too small. In one embodiment, the harmonic order is selected to be greater than 1.5 to limit the inductance of the coupling inductor $L_c$ 106 under the selected n not more than 50% of the inductance of the coupling inductor $L_c$ 106 under n=1.5.

Electronic Controller and the Control Methodology

Figure 5:
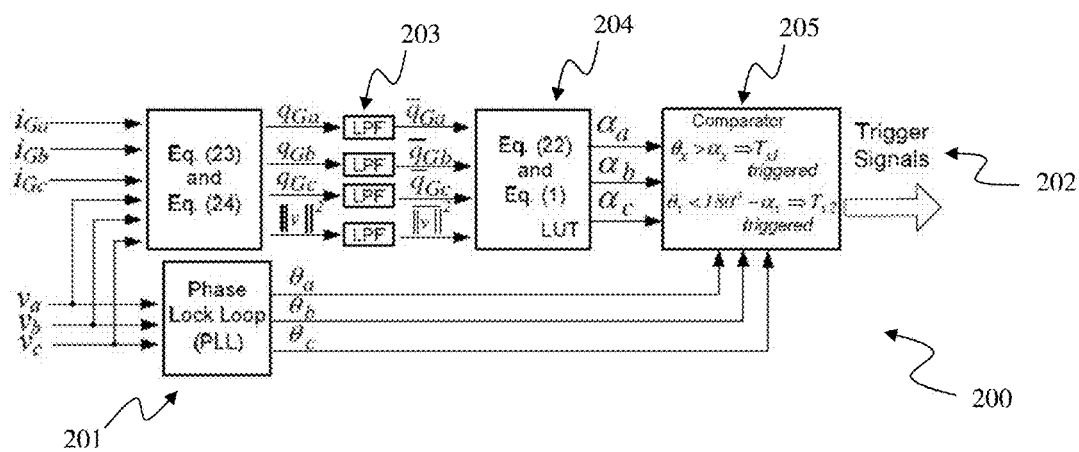
FIG. 5 depicts an exemplarily block diagram of an electronic controller for the TCLC compensator.

Based on the TCLC compensation system 100 as disclosed above, the preceding analysis has scrutinized thoroughly the design criteria for optimizing the reactive power compensation and harmonic current injection. In order to control the TCLC compensator 110 accordingly, well controlled trigger signals 202 are needed from an electronic controller 200. In contrast to the conventional SVC topology using the traditional definition of reactive power, the disclosed electronic controller 200 is derived from the generalized instantaneous reactive power theory [9] which can improve the response speed. FIG. 5 depicts a schematic diagram of the electronic controller 200 of the TCLC compensator 110.

The electronic controller 200 as disclosed comprises a phase lock loop (PLL) 201, a plurality of low pass filters (LPFs) 203, a look-up table (LUT) 204 and a comparator 205. The instantaneous grid voltage ($v_x$) and the generated grid current ($i_{Gx}$) of each phase are fed into the electronic controller 200. The phase lock loop (PLL) 201 can track the phase angle of the instantaneous grid voltage ($v_x$) and generate a phase angle ($\theta_x$) for each line of the power grid 104. The firing angles ($\alpha$) of the solid-state bidirectional switch is determined from a LUT 204 based on the power source reactive power ($Q_{Gx}$) and the square of norm of the three-phase instantaneous grid voltage ($\|v\|^2$), which is then compared with the phase angle ($\theta_x$) to generate the trigger signals 202.

To calculate the $X_{TCLC}$ in real time, the expression of $X_{TCLC}$ can be rewritten in terms of instantaneous values as:
(for TCLC compensator in star configuration)

$$X_{TCLC} = \frac{V_x^2}{Q_{cx}} = -\frac{2 \cdot \overline{\|v\|^2}}{3 \cdot \overline{q}_{Gx}} \quad (22a)$$

(for TCLC compensator in delta configuration)

$$X_{TCLC} = \frac{V_{xy}^2}{Q_{cxy}} = -\frac{2 \cdot \overline{\|v\|^2}}{\overline{q}_{Gxy}} = \frac{2 \cdot \overline{\|v\|^2}}{\overline{q}_{Gz} - \overline{q}_{Gx} - \overline{q}_{Gy}} \quad (22b)$$

In (22), the $\overline{\|v\|^2}$ and $\overline{q}_{Gx}$ can be expressed as:

$$\|v\|^2 = v_a^2 + v_b^2 + v_c^2 = 3 \cdot V_x^2 = V_{xy}^2 \quad (23)$$

and $$\begin{bmatrix} q_{Ga} \\ q_{Gb} \\ q_{Gc} \end{bmatrix} = \begin{bmatrix} v_b \cdot i_{Gc} - v_c \cdot i_{Gb} \\ v_c \cdot i_{Ga} - v_a \cdot i_{Gc} \\ v_a \cdot i_{Gb} - v_b \cdot i_{Ga} \end{bmatrix} \quad (24)$$

where:
- x, y, z stand for sequential phase a, b, c;
- $v_x$ is the instantaneous grid voltage;
- $\|v\|^2$ is the DC components of the square of norm of the three-phase instantaneous grid voltage;
- $q_{Gx}$ is the instantaneous power source reactive power of the induction generator or loading;
- $\overline{q}_{Gx}$ is the DC components of the instantaneous power source reactive power of the induction generator or loading; and
- $Q_{cx}$ and $Q_{cxy}$ are the phase and line to line compensating reactive power provided by TCLC compensator, $Q_{cx} \approx -\overline{q}_{Gx}/2$ and $Q_{cxy} \approx (\overline{q}_{Gz} - \overline{q}_{Gx} - \overline{q}_{Gy})/2$.

The real-time expression of $\overline{\|v\|^2}$ and $\overline{q}_{Gx}$ can be obtained from the equation (23) and (24) with a plurality of low pass filters (LPFs) 203. As shown in FIG. 5, after calculating $X_{TCLC}$ through (22), the firing angle $\alpha_x$ of the solid-state bidirectional switch can be determined by solving (1). Considering that (1) does not have a close form solution, a LUT 204 can be used to directly obtain $\alpha_x$. Finally, the trigger signals can be generated by the comparator 205, which compare $\alpha_x$ with the phase angle of the grid voltage $\theta_x$ for star connected or phase angle of line to line voltage $\theta_{xy}$ for delta connected. For star connected TCLC compensator, when phase angle $\theta_x$ (or $\theta_x$ for delta connected) is larger than $\alpha_x$ (or $\alpha_{xy}$ for delta connected) the thyristor $T_{x1}$ (or $T_{xy1}$ for delta connected) 108 is triggered. Similarly, when phase angle $\theta_x$ is smaller than 180°−$\alpha_x$ (or 180°−$\alpha_{xy}$ for delta connected), the thyristor $T_{x2}$ (or $T_{xy2}$ for delta connected) 108 is triggered.

Implementation and Verification

According to the embodiments disclosed above, the disclosed TCLC topology is verified by both simulations and experiments in comparison with the traditional FC-TCR (in SVC) and FC-TCR+PPF (combination of SVC and passive power filter). The simulations are carried out by using PSCAD/EMTDC. In experiments, 110V-5 kVA three-phase three-wire TCLC compensator 110 and FC-TCR experimental prototypes were designed and constructed in the laboratory. The TMS320F2812 digital controller is applied for both TCLC compensator 110 and FC-TCR with sampling frequency of 25 kHz where the SanRex PK110FG160 thyristors are used. Table II below shows the system parameters of the power grid, traditional FC-TCR, FC-TCR+PPF and the disclosed TCLC compensator 110 ($n_1$=3.6 and $n_2$=3.8) for both simulations and experiments.

TABLE II

System parameters of power grid and the disclosed TCLC compensator

| | Parameters | Physical values |
|---|---|---|
| Power Grid | $v_x$, f, $L_s$ | 110 V, 50 Hz, 1 mH |
| FC-TCR | $L_{PF}$, $C_{PF}$ | 30 mH, 160 µF |
| PPF of FC-TCR + PPF | $L_P$, $C_P$ | 8 mH, 50 µF |
| TCLC Compensator | $L_c$, $L_{PF}$, $C_{PF}$ | 5 mH, 30 mH, 160 µF |

Figures 15, 16A:
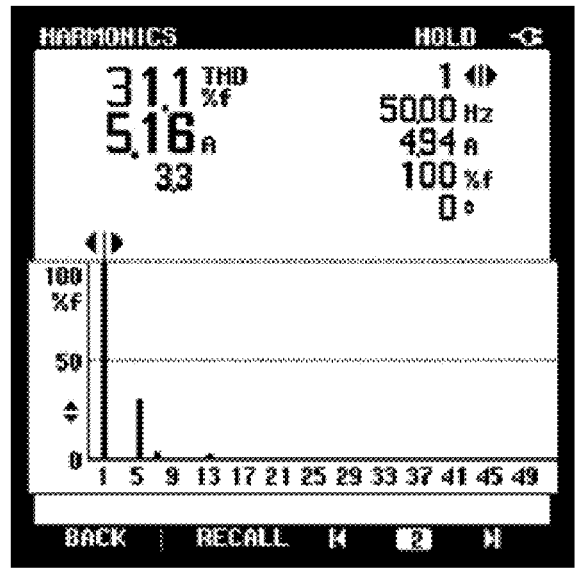
FIG. 15 shows the experimental results for the dynamic reactive power compensation of the present invention.
FIG. 16A shows the grid system current spectrums by experiment for inductive reactive power compensation for FC-TCR.
Figure 16B:
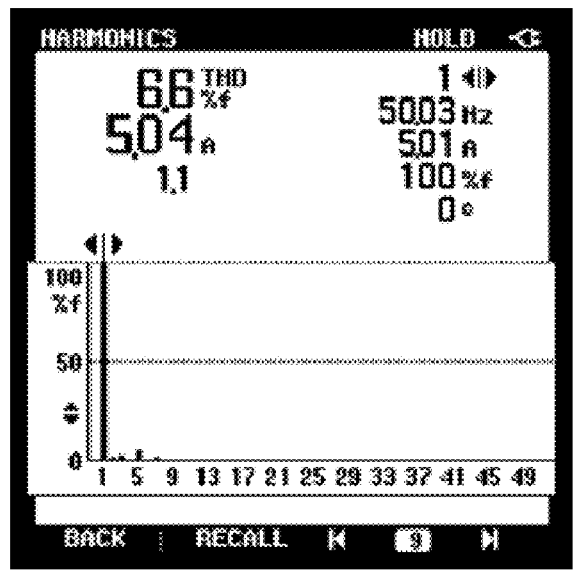
FIG. 16B shows the grid system current spectrums by experiment for inductive reactive power compensation for the present invention.
Figure 17A:
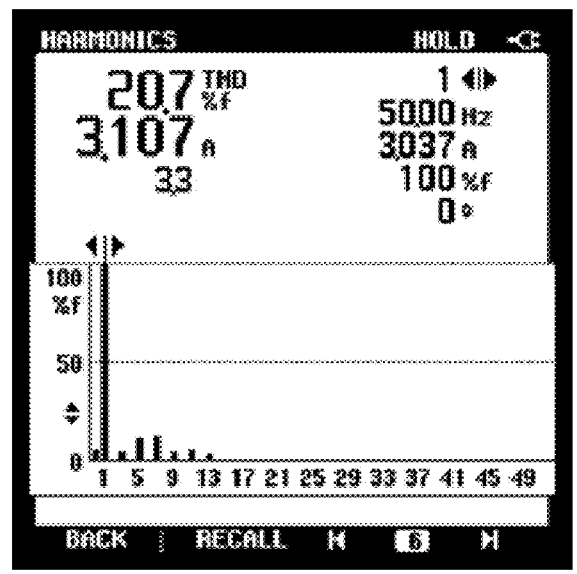
FIG. 17A shows the grid system current spectrums by experiment for capacitive reactive power compensation for FC-TCR.
Figure 17B:
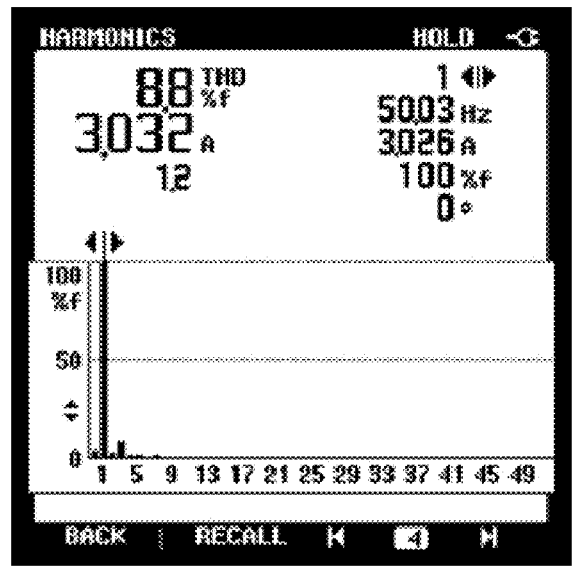
FIG. 17B shows the grid system current spectrums by experiment for capacitive reactive power compensation for the present invention.

FIG. 7 shows the comparison between (a) the conventional FC-TCR and (b) the TCLC compensator 110 developed by the present invention on the simulated fundamental and harmonic compensating currents under different firing angles ($\alpha$). FIGS. 8, 9, 13 and 14 show the simulated and experimental grid voltage and system current waveforms before and after the traditional FC-TCR, FC-TCR+PPF (in FIGS. 8 and 9 only) and the disclosed TCLC compensator under both inductive and capacitive reactive power cases. FIGS. 10 and 15 give the simulated and experimental result for the dynamic reactive power compensation by using the disclosed TCLC compensator 110. FIGS. 11, 12, 16 and 17 illustrate the simulated and experimental grid system current spectrums after the FC-TCR, FC-TCR+PPF (in FIGS. 11 and 12 only) and TCLC compensations in both inductive and capacitive reactive power cases.

In the analysis, the PF, the system voltage total harmonic distortion (THDv$_{sx}$) and the system current total harmonic distortions (THDi$_{sx}$) are scrutinized to confirm whether the expected performance can be achieved. PF is the ratio between real power and apparent power. THD is the ratio between the root mean square of all the harmonics to the root mean square of the fundamental component for voltage and current respectively. With referenced to the IEEE standard 519-2014 [10], the THD$_{vx}$ for laboratory-scaled low voltage application (bus voltage <1 kV) is required to be lower than 8%. On the other hand, the THDi$_{sx}$ is required to be lower than 15% under the present laboratory conditions of $I_{SC}/I_{L\epsilon}$ [100, 1000].

Simulation Results

TABLE III

Simulation results for inductive and capacitive reactivepower compensations by using traditional FC-TCR, FC-TCR + PPF and the disclosed TCLC compensator

| | Inductive reactive power | | | | Capacitive reactive power | | | |
|---|---|---|---|---|---|---|---|---|
| | Before Comp. | FC-TCR | FC-TCR + PPF | TCLC | Before Comp. | FC-TCR | FC-TCR + PPF | TCLC |
| $i_{sx}$(A) | 6.1 | 3.9 | 3.9 | 3.9 | 5.0 | 3.6 | 3.5 | 3.5 |
| $Q_{sx}$(var) | 400 | 9 | 6 | 5 | −430 | −9 | −7 | −7 |
| PF | 0.72 | 0.98 | 0.99 | 0.99 | 0.66 | 0.98 | 0.99 | 0.99 |

TABLE III-continued

Simulation results for inductive and capacitive reactivepower compensations by using traditional FC-TCR, FC-TCR + PPF and the disclosed TCLC compensator

|  | Inductive reactive power | | | | Capacitive reactive power | | | |
| --- | --- | --- | --- | --- | --- | --- | --- | --- |
|  | Before Comp. | FC-TCR | FC-TCR + PPF | TCLC | Before Comp. | FC-TCR | FC-TCR + PPF | TCLC |
| $THDv_x$(%) | 0.1 | 1.2 | 0.6 | 0.5 | 0.1 | 1.5 | 0.3 | 0.3 |
| $THDi_{sx}$(%) | 0.1 | 18.6* | 10 | 7.5 | 0.1 | 24.0* | 8.0 | 8.1 |

Notes:
Asterisked (*) item means unsatisfactory result

Figure 7A:
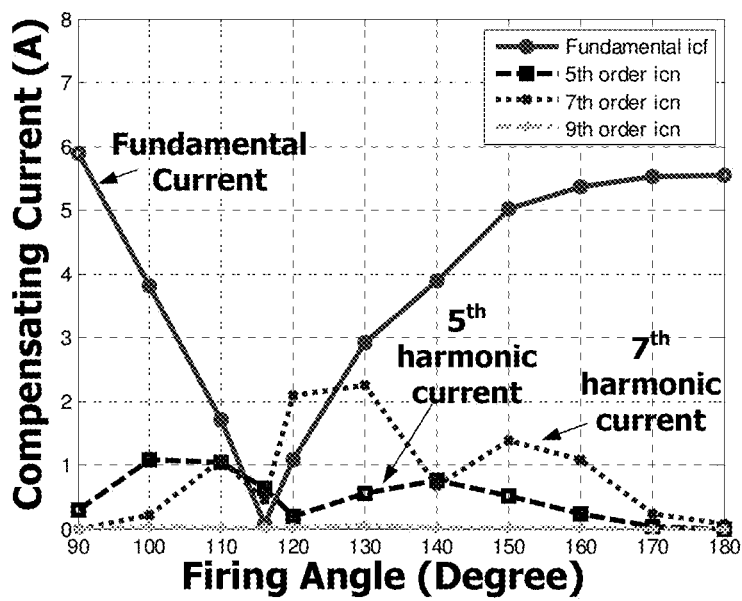
FIG. 7A shows the fundamental and harmonic compensating currents under different firing angles for FC-TCR.
Figure 8A:
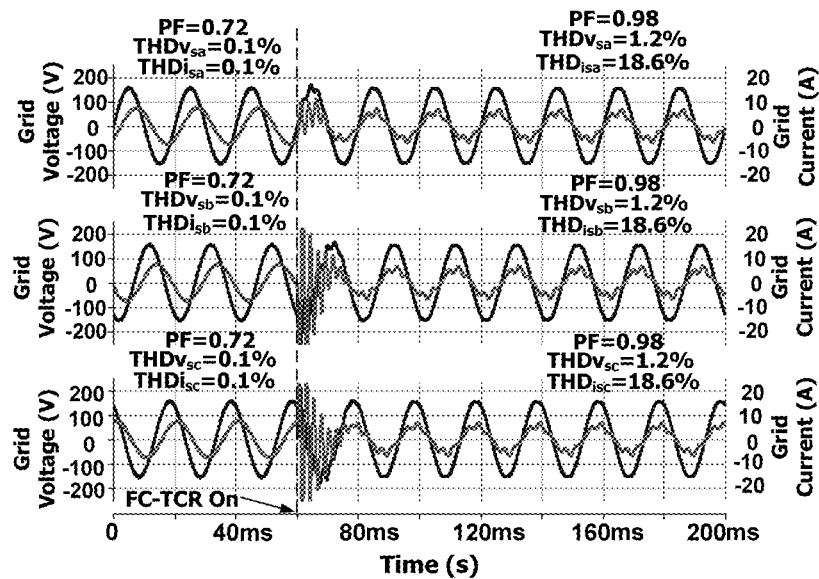
FIG. 8A shows the simulation results for the grid voltage and grid system current for FC-TCR for inductive reactive power compensation.
Figure 8B:
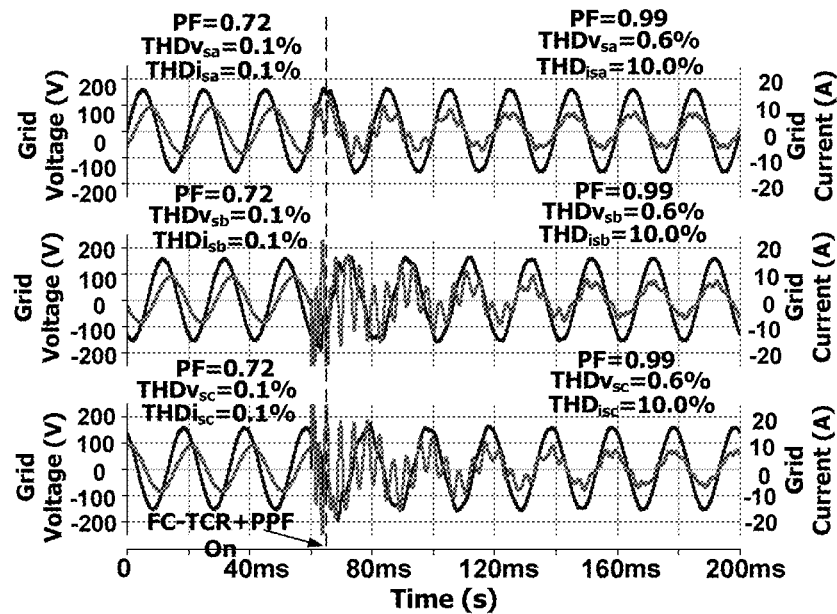
FIG. 8B shows the simulation results for the grid voltage and grid system current for FC-TCR+PPF for inductive reactive power compensation.

When FC-TCR is applied, FIGS. 8(*a*) and 9(*a*), Table III show that the simulated PF of the worst phase have been compensated from the original 0.72 (inductive PF) and 0.66 (capacitive PF) to 0.98 for both cases. As shown in FIGS. 8(*a*) and 9(*a*) as well as FIGS. 11(*a*) and 12(*a*), the $THDi_{sx}$ are increased after FC-TCR compensation. However, the worst phase simulated grid system current $THDi_{sx}$ ($THDi_{sx}$=18.6% for inductive case and $THDi_{sx}$=24.0% for capacitive case) cannot satisfy the standard. Moreover, FIGS. 8(*a*) and 9(*a*) and FIGS. 11(*a*) and 12(*a*) clearly show that large $5^{th}$ and $7^{th}$ order harmonic currents are injected into the power grid system after compensation, which agrees with the simulation results as shown in FIG. 7A.

From FIGS. 8B and 9B, FIGS. 11B and 12B and Table III, with PPF tuned at $5^{th}$ order, the FC-TCR+PPF can effectively reduce the $5^{th}$ order harmonic current generated by FC-TCR. After FC-TCR+PPF compensation, the PFs have been improved to 0.99 and the $THDi_{sx}$ are ≤10.0% for both inductive and capacitive reactive power compensations.

Figure 7B:
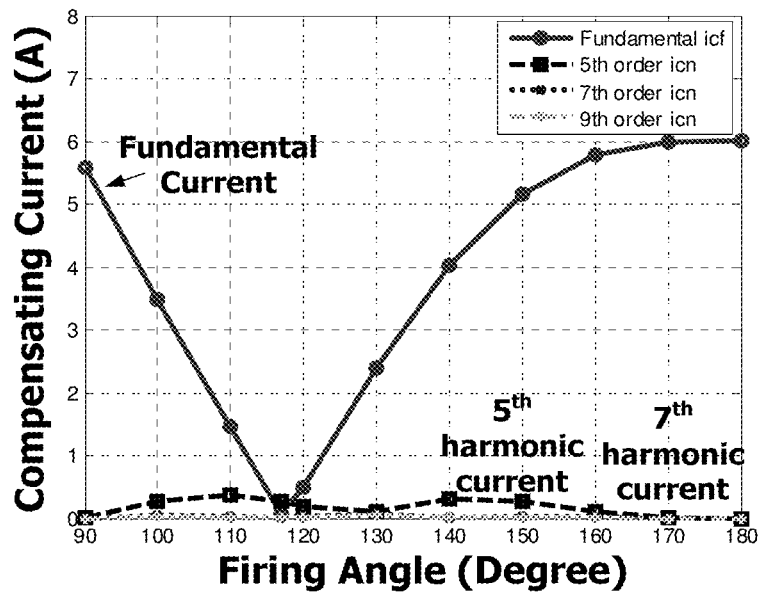
FIG. 7B shows the fundamental and harmonic compensating currents under different firing angles for the present invention.
Figure 8C:
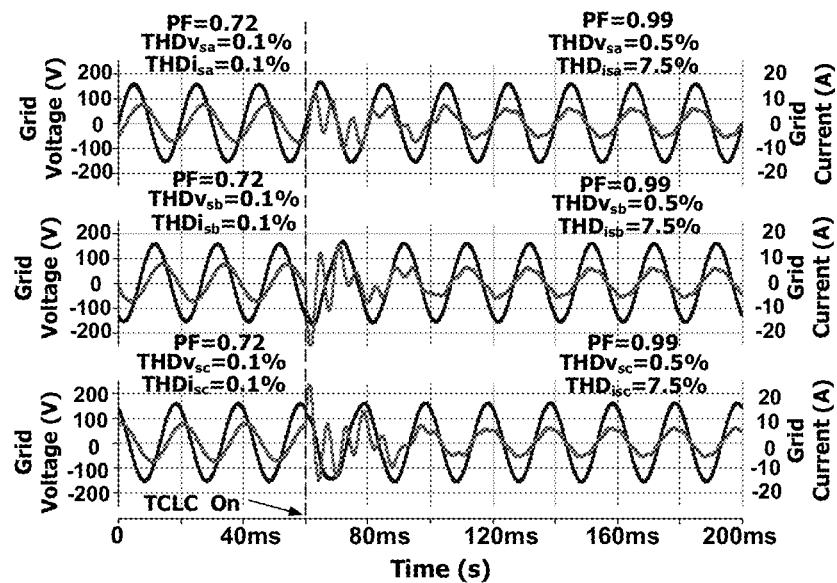
FIG. 8C shows the simulation results for the grid voltage and grid system current for the present invention for inductive reactive power compensation.
Figure 9A:
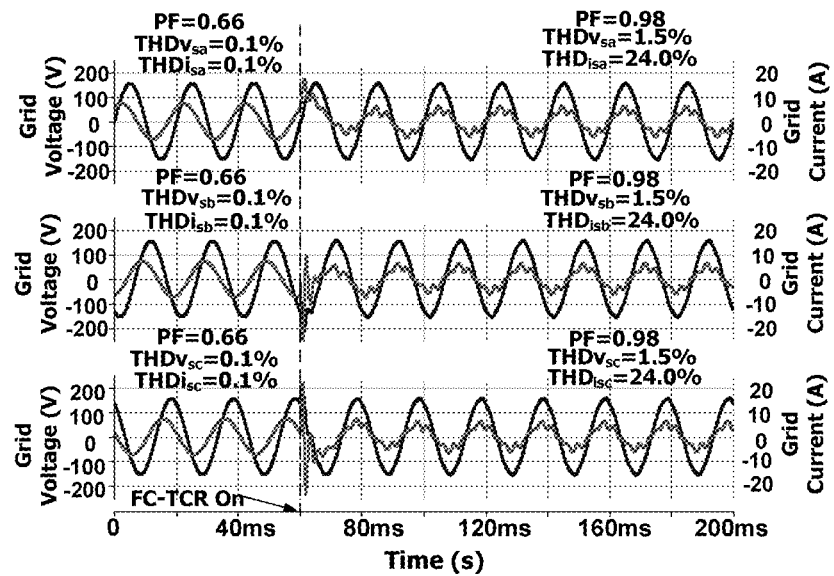
FIG. 9A shows the simulation results for the grid voltage and grid system current for FC-TCR for capacitive reactive power compensation.
Figure 9B:
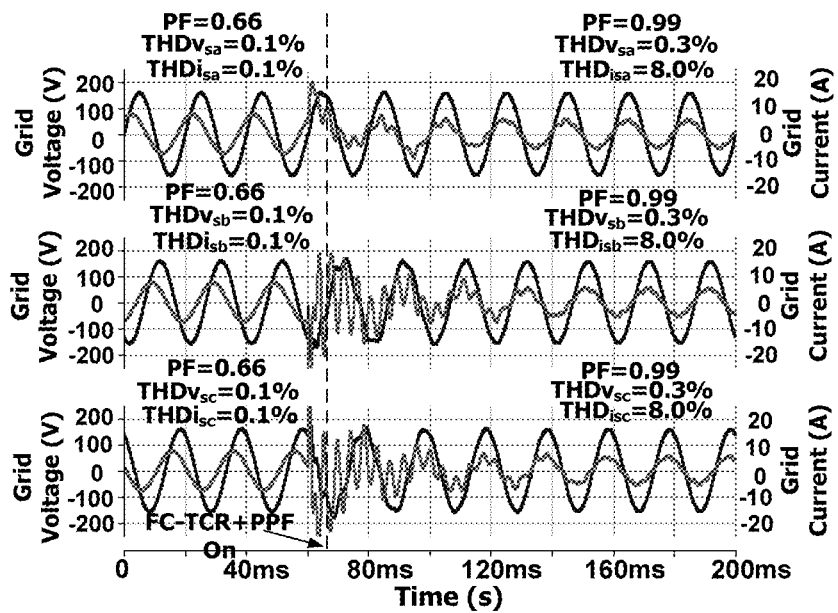
FIG. 9B shows the simulation results for the grid voltage and grid system current for FC-TCR+PPF for capacitive reactive power compensation.
Figure 9C:
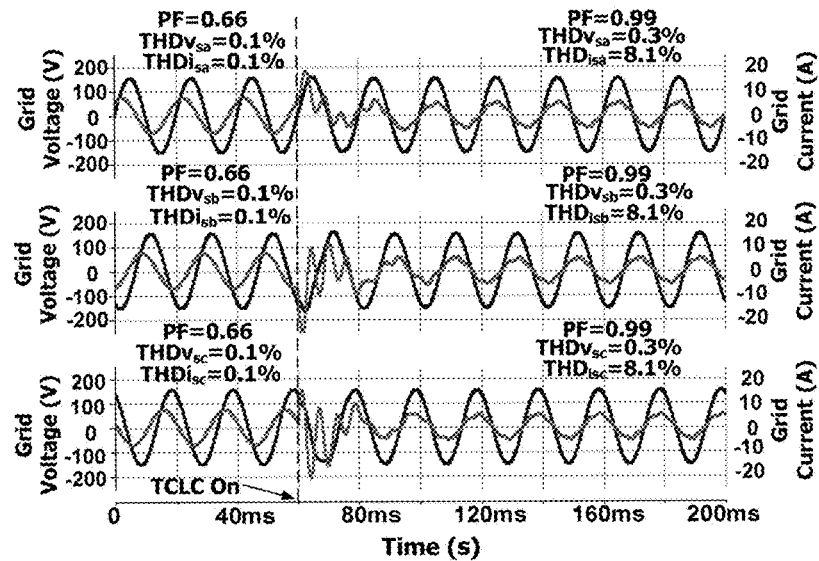
FIG. 9C shows the simulation results for the grid voltage and grid system current for the present invention for capacitive reactive power compensation.
Figure 10:
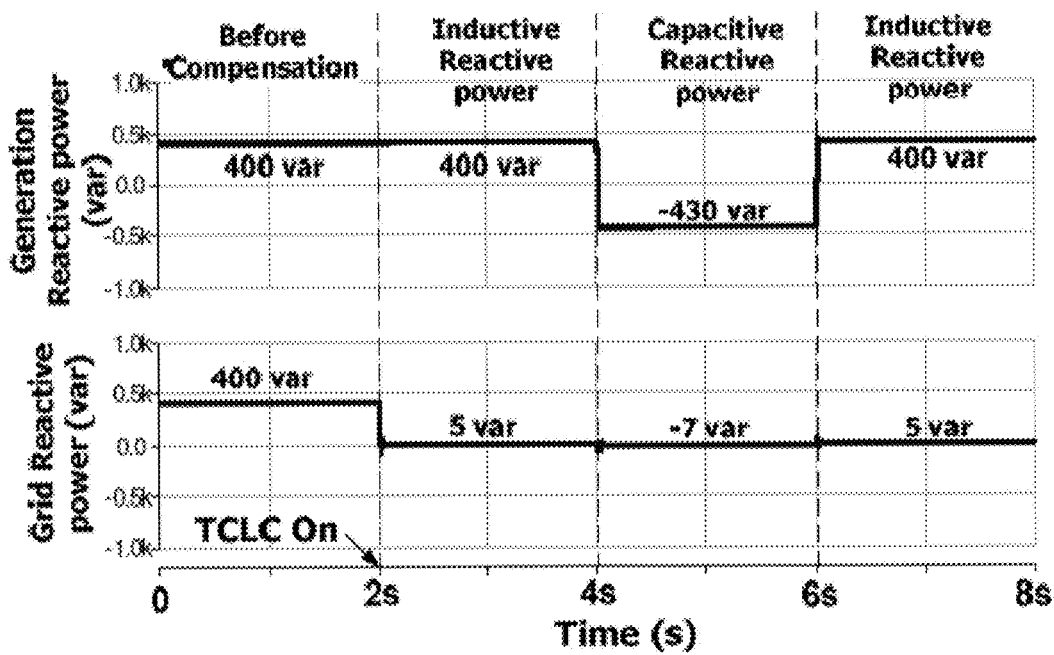
FIG. 10 shows the simulation results for the dynamic reactive power compensation of the present invention.
Figure 11A:
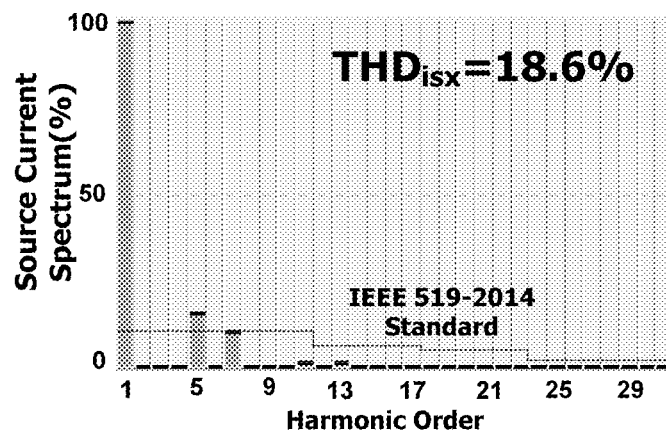
FIG. 11A shows the grid system current spectrums by simulation for inductive reactive power compensation for FC-TCR.
Figure 11B:
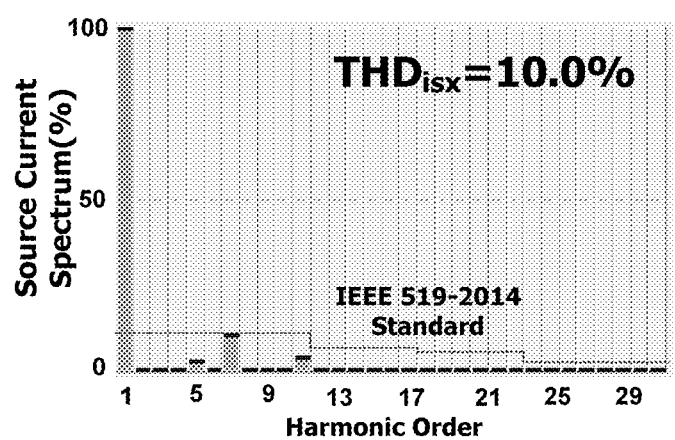
FIG. 11B shows the grid system current spectrums by simulation for inductive reactive power compensation for FC-TCR+PPF.
Figure 11C:
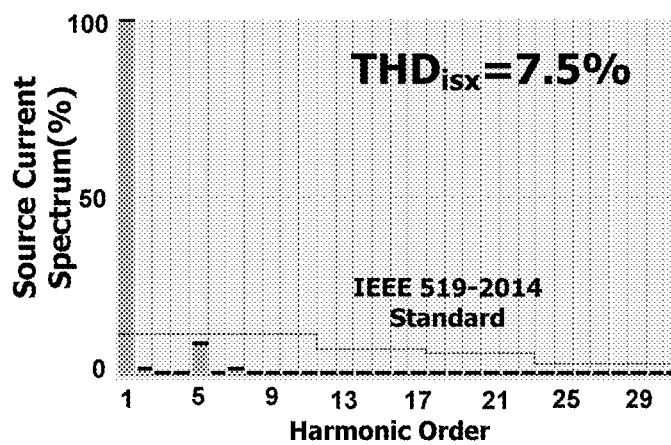
FIG. 11C shows the grid system current spectrums by simulation for inductive reactive power compensation for the present invention.
Figure 12A:
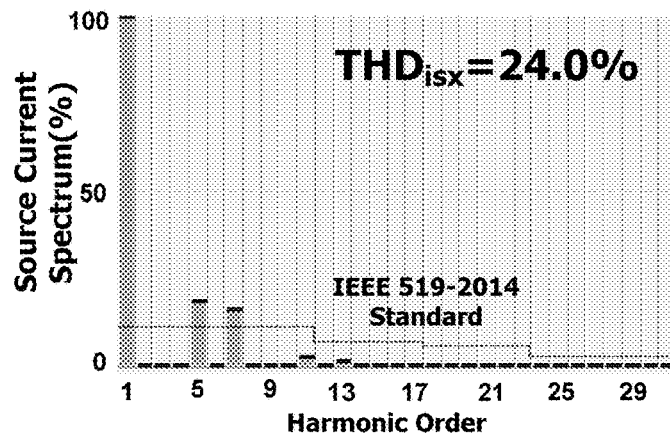
FIG. 12A shows the grid system current spectrums by simulation for capacitive reactive power compensation for FC-TCR.
Figure 12B:
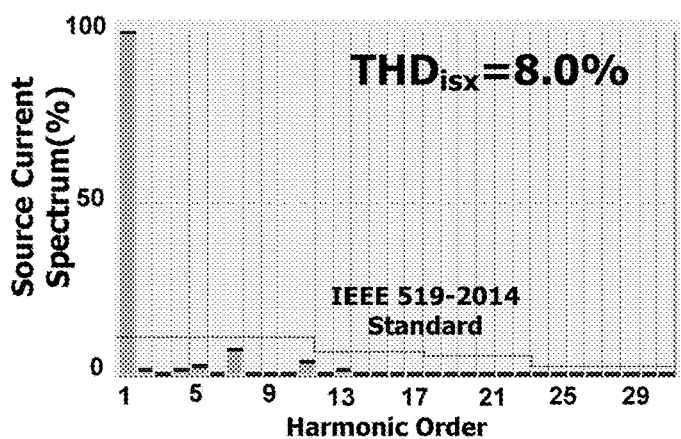
FIG. 12B shows the grid system current spectrums by simulation for capacitive reactive power compensation for FC-TCR+PPF.
Figure 12C:
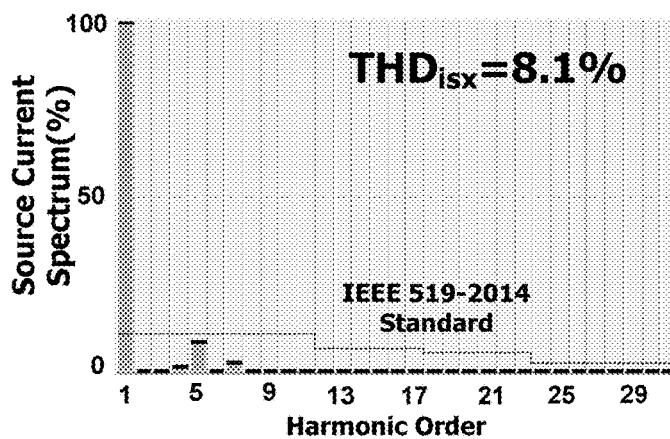
FIG. 12C shows the grid system current spectrums by simulation for capacitive reactive power compensation for the present invention.

When the TCLC compensator 110 is applied, FIGS. 8C and 9C and Table III show that the simulated PFs of the worst phase are compensated to close to unity for inductive and capacitive reactive power compensations. As shown in FIGS. 8C and 9C, and FIGS. 11C and 12C, the simulated system current $THDi_{sx}$ of the worst phase are compensated to 7.5% for inductive case and 8.1% for capacitive case, in which the simulated $THDi_{sx}$ satisfies the standard. Moreover, FIGS. 11C and 12C clearly show that much smaller $5^{th}$ and $7^{th}$ order harmonic currents are injected into the power grid system after TCLC compensation, which agrees with the simulation results as shown in FIG. 7B and verifies the effectiveness of the disclosed TCLC compensator 110 in reducing the current harmonics injection during operation. In addition, FIG. 10 shows that the disclosed TCLC compensator 110 can dynamically compensate the inductive and capacitive reactive power.

Based on simulation results, both FC-TCR+PPF and the disclosed TCLC compensator 110 can achieve better performance than FC-TCR. Comparing FC-TCR+PPF with TCLC, they obtain similar compensation performances but TCLC requires fewer components, thus resulting in lower cost.

Experimental Results

TABLE IV

Experimental results for inductive and capacitive reactive power compensations by using traditional FC-TCR and the disclosed TCLC compensator

|  |  | Inductive reactive power | | | Capacitive reactive power | | |
| --- | --- | --- | --- | --- | --- | --- | --- |
|  |  | Before Comp. | FC-TCR | TCLC | Before Comp. | FC-TCR | TCLC |
| $i_{sx}$ | A | 6.9 | 5.0 | 5.2 | 3.6 | 3.1 | 3.0 |
| (A) | B | 6.9 | 5.1 | 5.2 | 3.6 | 2.9 | 2.8 |
|  | C | 6.9 | 5.3 | 5.3 | 3.6 | 2.9 | 2.9 |
| $Q_{sx}$ | A | 560 | 20 | 10 | −310 | −20 | −30 |
| (var) | B | 550 | −10 | −30 | −320 | −30 | −20 |
|  | C | 550 | 20 | −30 | −320 | −30 | −40 |
| PF | A | 0.69 | 0.95 | 0.99 | 0.65 | 0.96 | 0.98 |
|  | B | 0.70 | 0.96 | 0.99 | 0.65 | 0.95 | 0.98 |
|  | C | 0.70 | 0.95 | 0.99 | 0.65 | 0.94 | 0.98 |
| $THDv_x$ | A | 1.0 | 4.5 | 1.1 | 1.0 | 1.7 | 1.0 |
| (%) | B | 1.1 | 4.4 | 1.2 | 1.1 | 1.8 | 1.3 |
|  | C | 1.3 | 4.5 | 1.3 | 1.1 | 1.7 | 1.2 |
| $THDi_{sx}$ | A | 2.1 | 31.1* | 6.6 | 2.2 | 20.7* | 8.8 |
| (%) | B | 2.0 | 25.6* | 6.0 | 2.5 | 20.1* | 9.0 |
|  | C | 2.1 | 30.4* | 6.4 | 2.6 | 18.1* | 9.7 |

Notes:
Asterisked (*) item means unsatisfactory result

Figure 13A:
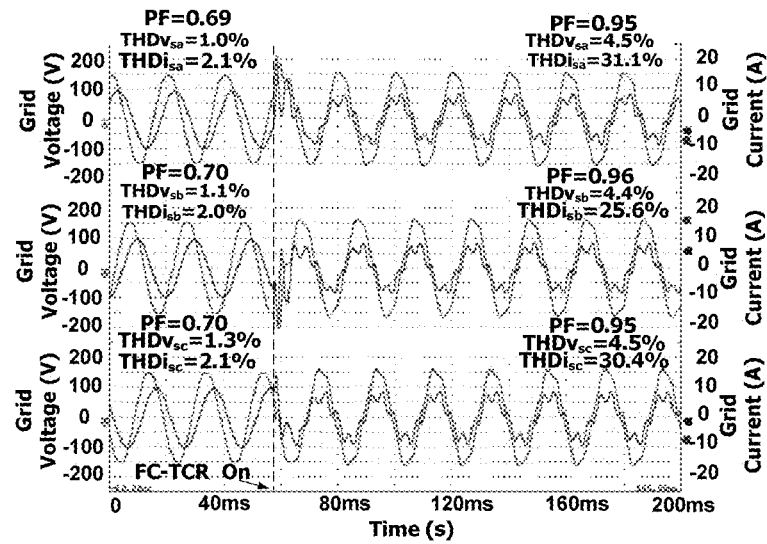
FIG. 13A shows the experimental results for the grid voltage and grid system current for FC-TCR for inductive reactive power compensation.

When FC-TCR is applied, FIGS. 13(*a*) and 14(*a*) and Table IV show that the experimental PFs of the worst phase are compensated to 0.95 (phases a and c) and 0.94 (phase c) from the original 0.69 (inductive PF) and 0.65 (capacitive PF), respectively. As shown in FIGS. 13(*a*) and 14(*a*) and FIGS. 16(*a*) and 17(*a*), the worst phase experimental grid system current $THDi_{sx}$ ($THDi_{sx}$=31.1% for inductive case and $THDi_{sx}$=20.7% for capacitive case) cannot satisfy standard.

Figure 13B:
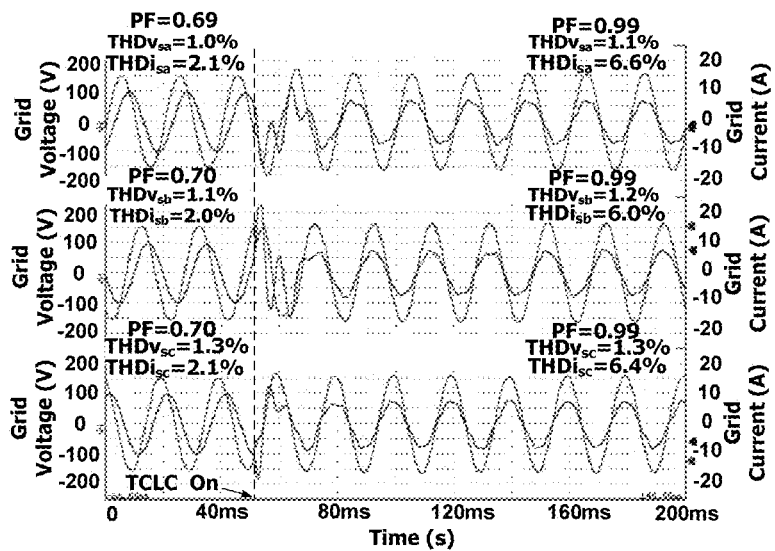
FIG. 13B shows the experimental results for the grid voltage and grid system current for the present invention for inductive reactive power compensation.
Figure 14A:
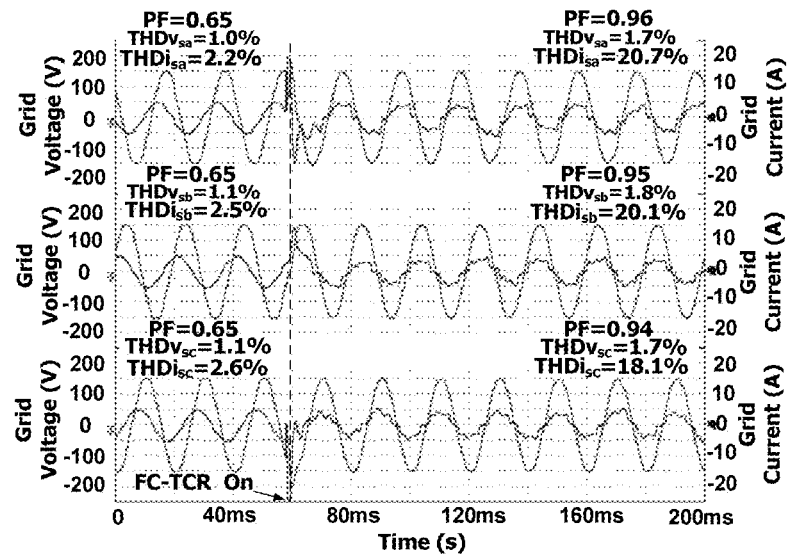
FIG. 14A shows the experimental results for the grid voltage and grid system current for FC-TCR for capacitive reactive power compensation.
Figure 14B:
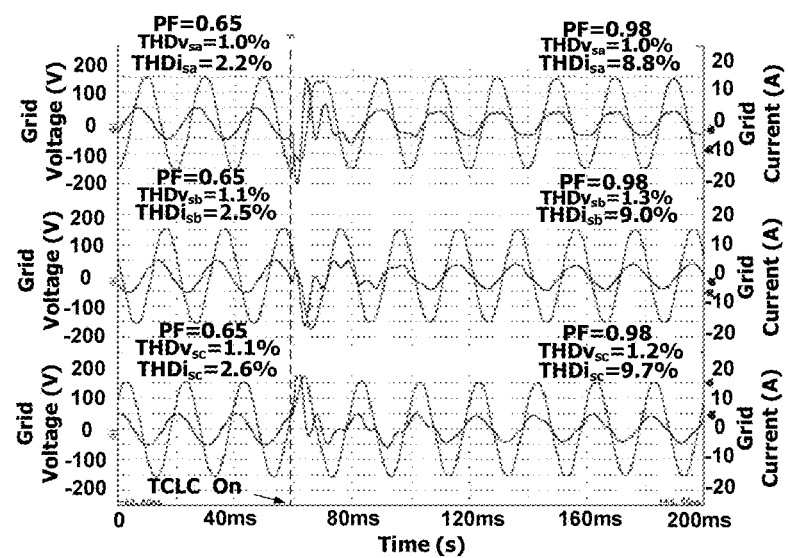
FIG. 14B shows the experimental results for the grid voltage and grid system current for the present invention for capacitive reactive power compensation.

When the TCLC compensator 110 is applied, FIGS. 13(*b*) and 14(*b*) and Table IV show that the experimental PFs of the worst phase are compensated to close to unity (0.99 and 0.98) for both inductive and capacitive reactive power compensations. As shown in FIGS. 13(b) and 14(b), and FIGS. 16(b) and 17(b), the experimental $\text{THDi}_{sx}$ of the worst phase have been compensated to 6.6% for inductive case and 9.7% for capacitive case, in which the $\text{THDi}_{sx}$ satisfies the standard. Moreover, FIGS. 13(b) and 14(b) clearly show that much smaller $5^{th}$ and $7^{th}$ order harmonic currents are injected into the power grid system after TCLC compensation. FIG. 15 shows that the disclosed TCLC compensator 110 can dynamically compensate the inductive and capacitive reactive power.

Based on the simulation and experimental results, it is demonstrated that the TCLC compensator 110 can provide better dynamic reactive power compensation with much less harmonic currents injection, while the traditional FC-TCR injects significant low order current harmonics into the power grid during operation.

While the disclosed TCLC compensator describes certain examples with certain system parameters, it is to be understood that the systems and methods described herein are not limited to these examples and system parameters, but on the contrary, and are intended to encompass various modifications and equivalent arrangements included within the spirit and scope of the appended claims.

CITED REFERENCES

The following documents are cited in this patent application. References [1] and [3]-[9] are incorporated by reference herein.

[1] X. Yuan et al., "DC-link voltage control of a full power converter for wind generator operating in weak-grid systems," *IEEE Trans. Power Electron.*, vol. 24, no. 9, pp. 2178-2192, September 2009.

[2] K.-J. Sun, "Thyristor control LC capacitance compensation circuit," CN201966624U, September 2011.

[3] S. E. Haque, N. H. Malik, and W. Shepherd, "Operation of a parallel capacitor thyristor controlled reactor (FC-TCR) power factor compensator," *IEEE Trans. Power App. and Syst.*, vol. PAS-104, no. 6, July 1985.

[4] B. Singh, R. Saha, A. Chandra, and K. Al-Haddad, "Static synchronous compensators (STATCOM): A review," *IET Power Electron.*, vol. 2, no. 4, pp. 297-324, July 2009.

[5] J. S. Benton, "Virtual instrument measures harmonic filter duty," *IEEE Comput. Appl. Power*, vol. 8, no. 4, pp. 43-46, October 1995.

[6] L. Zanotto et al., "Filter design for harmonic reduction in high-voltage booster for railway applications," *IEEE Trans. Power Del.*, vol. 20, no. 1, pp. 258-263, January 2005.

[7] A. Luo et al., "Combined system for harmonic suppression and reactive power compensation," *IEEE Trans. Ind. Electron.*, vol. 56, no. 2, pp. 418-428, February 2009.

[8] D. B. Kulkarni, and G. R. Udupi, "ANN-based SVC switching at distribution level for minimal-injected harmonics," *IEEE Trans. Power Del.* vol. 25, no. 3, pp. 1978-1985, July 2010.

[9] F. Z. Peng and J. S. Lai, "Generalized instantaneous reactive power theory for three-phase power systems," *IEEE Trans. Instrum. Meas.*, vol. 45, no. 1, pp. 293-297, February 1996.

[10] IEEE recommended practices and requirements for harmonic control in electrical power systems, 2014, IEEE Standard 519-2014.

What is claimed is:

1. A thyristor controlled LC (TCLC) compensator for compensating dynamic reactive power in a power grid system, the TCLC compensator comprising:
   three branches of sub-circuit, each branch of sub-circuit having a first branch-terminal and a second branch-terminal, said each branch of the sub-circuit further comprising:
      a controllable reactor (CR) comprising a parallel inductor ($L_{PF}$) connected in series with a solid-state bidirectional switch;
      a coupling inductor ($L_c$) having a first terminal and a second terminal, the first terminal being connected to a line in the power grid system and the second terminal being connected to the CR; and
      a parallel capacitor ($C_{PF}$) connected in parallel to the CR;
   and
   an electronic controller for controlling the solid-state bidirectional switch of said each branch of the sub-circuit and determining when to switch on the solid-state bidirectional switch;
   wherein the coupling inductor ($L_c$) is determined according to a harmonic order (n) of a harmonic current generated to the line in the power grid system by the solid-state bidirectional switch in the TCLC compensator such that the harmonic current is mitigated, where n is selected such that:
      the selected n is smaller than 5 so that the harmonic current generated under the selected n is less than 50% of the harmonic current generated under n=5; and
      the selected n is greater than 1.5 so that an inductance of the coupling inductor ($L_c$) under the selected n is less than 50% of an inductance of the coupling inductor ($L_c$) under n=1.5.

2. The TCLC compensator of claim 1, wherein the TCLC compensator is connected in a star configuration or a delta configuration.

3. The TCLC compensator of claim 2, wherein the star configuration has the first branch-terminal of said each branch of the sub-circuit connected to each line of the power grid system, and has all the second branch-terminals of all sub-circuits interconnected.

4. The TCLC compensator of claim 2, wherein the delta configuration has the first branch-terminal of said each branch of the sub-circuit connected to both line of the power grid system and the second branch-terminal of another branch of sub-circuit, and has the second branch-terminal connected to both another line of the power grid system and the first terminal of the third remaining branch of sub-circuit.

5. The TCLC compensator of claim 1, wherein the TCLC compensator is shunt-connected to each line of the power grid system at the terminal of the system inductor ($L_s$) with a grid voltage ($V_x$) on each power line.

6. The TCLC compensator of claim 1, wherein the solid-state bidirectional switch comprises two back-to-back connected thyristors ($T_{x1}$ and $T_{x2}$).

7. The TCLC compensator of claim 1, wherein the parallel capacitor ($C_{PF}$) has fundamental impedance greater than the parallel inductor's ($L_{PF}$) fundamental impedance.

8. The TCLC compensator of claim 1, wherein the parallel capacitor ($C_{PF}$) of the TCLC compensator in star configuration has a capacitance value selected to maximize a reactive power compensation range by the following equations:

$$Q_{cx(MaxCap)} = \frac{V_x^2}{X_{C_{PF}} - X_{L_c}}$$

$$Q_{cx(MaxInd)} = \frac{V_x^2}{\frac{X_{L_{PF}} X_{C_{PF}}}{X_{C_{PF}} - X_{L_{PF}}} + X_{L_c}}$$

$$C_{PF} = \frac{Q_{Gx(MaxInd)}}{\omega^2 Q_{Gx(MaxInd)} L_c - \omega V_x^2}$$

where:

x stands for phase a, b, c;

$Q_{Gx(MaxInd)}$, $Q_{Gx(MaxCap)}$ are the maximum phase inductive and capacitive reactive power generated by the induction generator;

$Q_{cx(MaxInd)}$ and $Q_{cx(MaxCap)}$ are the maximum phase inductive and capacitive reactive power provided by the TCLC compensator;

$Q_{cx(MaxInd)} = Q_{Gx(MaxCap)}$ for maximizing the phase inductive reactive power generated by TCLC compensator;

$Q_{cx(MaxCap)} = Q_{Gx(MaxInd)}$ for maximizing the phase capacitive reactive power generated by TCLC compensator;

ω is the fundamental angular frequency.

9. The TCLC compensator of claim 1, wherein the parallel capacitor ($C_{PF}$) of the TCLC compensator in delta configuration has a capacitance value selected to maximize a reactive power compensation range by the following equations:

$$Q_{cxy(MaxCap)} = = -\frac{V_{xy}^2}{X_{C_{PF}} - X_{L_c}} = -\frac{3 \cdot V_x^2}{X_{C_{PF}} - X_{L_c}}$$

$$Q_{cxy(MaxInd)} = \frac{V_{xy}^2}{\frac{X_{L_{PF}} X_{C_{PF}}}{X_{C_{PF}} - X_{L_{PF}}} + X_{L_c}} = \frac{3 \cdot V_x^2}{\frac{X_{L_{PF}} X_{C_{PF}}}{X_{C_{PF}} - X_{L_{PF}}} + X_{L_c}}$$

$$C_{PF} = \frac{Q_{Gxy(MaxInd)}}{\omega^2 Q_{Gxy(MaxInd)} L_c - 3 \cdot \omega V_x^2}$$

where:

x and y stand for phase a, b, c;

$Q_{Gxy(MaxInd)}$ and $Q_{Gxy(MaxCap)}$ are the maximum line to line inductive and capacitive reactive power generated by an induction generator;

$Q_{cxy(MaxInd)}$ and $Q_{cxy(MaxCap)}$ are the maximum line to line inductive and capacitive reactive power provided by TCLC compensator;

$Q_{cxy(MaxInd)} = Q_{Gxy(MaxCap)}$ for maximizing the line to line inductive reactive power generated by TCLC compensator;

$Q_{cxy(MaxCap)} = Q_{Gxy(MaxInd)}$ for maximizing the line to line capacitive reactive power generated by TCLC compensator;

ω is the fundamental angular frequency.

10. The TCLC compensator of claim 1, wherein the parallel inductor ($L_{PF}$) of the TCLC compensator in star configuration has an inductance value selected to maximize a capacitive reactive power compensation range by the following equations:

$$Q_{cx(MaxInd)} = \frac{V_x^2}{\frac{X_{L_{PF}} X_{C_{PF}}}{X_{C_{PF}} - X_{L_{PF}}} + X_{L_c}}$$

$$L_{PF} = \frac{V_x^2 - \omega L_c Q_{Gx(MaxCap)}}{\omega Q_{Gx(MaxCap)} - \omega^3 L_c C_{PF} Q_{Gx(MaxCap)} + \omega^2 V_x^2 C_{PF}}$$

where:

$Q_{Gx(MaxInd)}$, $Q_{Gx(MaxCap)}$ are the maximum phase inductive and capacitive reactive power generated by an induction generator;

$Q_{cx(MaxInd)}$ and $Q_{cx(MaxCap)}$ are the maximum phase inductive and capacitive reactive power provided by the TCLC compensator;

$Q_{cx(MaxInd)} = Q_{Gx(MaxCap)}$ for maximizing the phase inductive reactive power generated by TCLC compensator;

$Q_{cx(MaxCap)} = Q_{Gx(MaxInd)}$ for maximizing the phase capacitive reactive power generated by TCLC compensator;

ω is the fundamental angular frequency.

11. The TCLC compensator of claim 1, wherein the parallel inductor ($L_{PF}$) of the TCLC compensator in delta configuration has an inductance value selected to maximize a capacitive reactive power compensation range by the following equations:

$$Q_{cxy(MaxInd)} = \frac{V_{xy}^2}{\frac{X_{L_{PF}} X_{C_{PF}}}{X_{C_{PF}} - X_{L_{PF}}} + X_{L_c}} = \frac{3 \cdot V_x^2}{\frac{X_{L_{PF}} X_{C_{PF}}}{X_{C_{PF}} - X_{L_{PF}}} + X_{L_c}}$$

$$L_{PF} = \frac{3V_x^2 - \omega L_c Q_{Gxy(MaxCap)}}{\omega Q_{Gxy(MaxCap)} - \omega^3 L_c C_{PF} Q_{Gxy(MaxCap)} + 3 \cdot \omega^2 V_x^2 C_{PF}}$$

where:

$Q_{Gxy(MaxInd)}$ and $Q_{Gxy(MaxCap)}$ are the maximum line to line inductive and capacitive reactive power generated by an induction generator;

$Q_{cxy(MaxInd)}$ and $Q_{cxy(MaxCap)}$ are the maximum line to line inductive and capacitive reactive power provided by TCLC compensator;

$Q_{cxy(MaxInd)} = Q_{Gxy(MaxCap)}$ for maximizing the line to line inductive reactive power generated by TCLC compensator;

$Q_{cxy(MaxCap)} = Q_{Gxy(MaxInd)}$ for maximizing the line to line capacitive reactive power generated by TCLC compensator;

ω is the fundamental angular frequency.

12. The TCLC compensator of claim 1, wherein the coupling inductor ($L_c$) has an inductance value selected according to the following equations to minimize the harmonic currents injection by the solid-state bidirectional switch:

$$L_c = \frac{1}{(2\pi f n_1)^2 C_{PF}}$$

and $$L_c = \frac{1}{(2\pi f n_2)^2 C_{PF} - 1/L_{PF}}$$

where
f is the system frequency; and
$n \approx n_1 \approx n_2$ are the harmonic orders to be selected in accordance to claim 1.

13. The TCLC compensator of claim 1, wherein the firing angle ($\alpha$) of the solid-state bidirectional switch in star configuration is selected according to the following equations:

$$X_{TCLC}(\alpha) = \frac{\pi X_{L_{PF}} X_{C_{PF}}}{X_{C_{PF}}(2\pi - 2\alpha + \sin 2\alpha) - \pi X_{L_{PF}}} + X_{L_c}$$

$$X_{TCLC} = \frac{V_x^2}{Q_{cx}} = -\frac{2 \cdot \|\bar{v}\|^2}{3 \cdot \bar{q}_{Gx}}$$

$$\|v\|^2 = v_a^2 + v_b^2 + v_c^2 = 3 \cdot V_x^2 = V_{xy}^2$$

$$\begin{bmatrix} q_{Ga} \\ q_{Gb} \\ q_{Gc} \end{bmatrix} = \begin{bmatrix} v_b \cdot i_{Gc} - v_c \cdot i_{Gb} \\ v_c \cdot i_{Ga} - v_a \cdot i_{Gc} \\ v_a \cdot i_{Gb} - v_b \cdot i_{Ga} \end{bmatrix}$$

where
x, y, z stand for sequential phase a, b, c;
$v_x$ is the instantaneous grid voltage;
$\|\bar{v}\|^2$ is the DC components of the square of norm of the three-phase instantaneous grid voltage;
$q_{Gx}$ is the instantaneous reactive power of an induction generator;
$\bar{q}_{Gx}$ is the DC components of the instantaneous reactive power of an induction generator; and
$Q_{cx}$ is the phase compensating reactive power provided by the TCLC compensator, where $Q_{cx} \approx -\bar{q}_{Gx}/2$.

14. The TCLC compensator of claim 1, wherein the firing angle ($\alpha$) of the solid-state bidirectional switch in delta configuration is selected according to the following equations:

$$X_{TCLC}(\alpha) = \frac{\pi X_{L_{PF}} X_{C_{PF}}}{X_{C_{PF}}(2\pi - 2\alpha + \sin 2\alpha) - \pi X_{L_{PF}}} + X_{L_c}$$

$$X_{TCLC} = \frac{V_{xy}^2}{Q_{cxy}} = -\frac{2 \cdot \|\bar{v}\|^2}{\bar{q}_{Gxy}} = \frac{2 \cdot \|\bar{v}\|^2}{\bar{q}_{Gz} - \bar{q}_{Gx} - \bar{q}_{Gy}}$$

$$\|v\|^2 = v_a^2 + v_b^2 + v_c^2 = 3 \cdot V_x^2 = V_{xy}^2$$

$$\begin{bmatrix} q_{Ga} \\ q_{Gb} \\ q_{Gc} \end{bmatrix} = \begin{bmatrix} v_b \cdot i_{Gc} - v_c \cdot i_{Gb} \\ v_c \cdot i_{Ga} - v_a \cdot i_{Gc} \\ v_a \cdot i_{Gb} - v_b \cdot i_{Ga} \end{bmatrix}$$

where
x, y, z stand for sequential phase a, b, c;
$v_x$ is the instantaneous grid voltage;
$\|\bar{v}\|^2$ is the DC components of the square of norm of the three-phase instantaneous grid voltage;
$q_{Gx}$ is the instantaneous reactive power of an induction generator;
$\bar{q}_{Gx}$ is the DC components of the instantaneous reactive power of an induction generator; and
$Q_{cxy}$ is the line to line compensating reactive power provided by the TCLC compensator, where $Q_{cxy} \approx (\bar{q}_{Gz} - \bar{q}_{Gx} - \bar{q}_{Gy})/2$.

15. The TCLC compensator of claim 1, wherein the electronic controller further comprises a phase lock loop (PLL), a plurality of low pass filters (LPF), a look-up table (LUT) and a comparator.

16. The TCLC compensator of claim 1, wherein the firing angle ($\alpha$) is deduced and obtained from a look-up table (LUT) in the electronic controller.

17. The TCLC compensator of claim 1, wherein the firing angle ($\alpha$) generates a trigger signal by comparing the firing angle ($\alpha$) with the phase angle of each of the grid voltage ($v_x$).

18. A method for compensating dynamic reactive power in a power grid system comprising the steps of:
providing a coupling inductor ($L_c$), having a first terminal and a second terminal, connected to a line of the power grid system at the first terminal and to a controllable reactor (CR) at the second terminal; and
determining an inductance value for the coupling inductor ($L_c$) in accordance to a harmonic order (n) of the harmonic current generated to the line in the power grid system by the solid-state bidirectional switch in the TCLC compensator where n is selected such that:
the selected n is smaller than 5 so that the harmonic current generated under the selected n is less than 50% of the harmonic current generated under n=5; and
the selected n is greater than 1.5 so that an inductance of the coupling inductor ($L_c$) under the selected n is less than 50% of an inductance of the coupling inductor ($L_c$) under n=1.5.

* * * * *